United States Patent [19]
Yoshii et al.

[11] Patent Number: 5,122,660
[45] Date of Patent: Jun. 16, 1992

[54] DISTANCE MEASURING SYSTEM UTILIZING AN OBJECT WITH AT LEAST ONE INCLINED SURFACE

[75] Inventors: Minoru Yoshii; Noriyuki Nose, both of Tokyo; Yukichi Niwa; Ryo Kuroda, both of Atsugi, all of Japan

[73] Assignee: Canon Kabushiki Kaisha, Tokyo, Japan

[21] Appl. No.: 671,657

[22] Filed: Mar. 19, 1991

Related U.S. Application Data

[63] Continuation of Ser. No. 563,689, Aug. 3, 1990, abandoned, which is a continuation of Ser. No. 190,250, May 4, 1988, abandoned.

[30] Foreign Application Priority Data

| May 11, 1987 | [JP] | Japan | 62-112260 |
| May 11, 1987 | [JP] | Japan | 62-112261 |
| May 11, 1987 | [JP] | Japan | 62-112262 |

[51] Int. Cl.⁵ ............................... H01J 3/14
[52] U.S. Cl. ............... 250/237 G; 250/231.16
[58] Field of Search ........ 250/236 G, 237 R, 231 SE, 250/231.16; 340/347 P; 356/395; 33/125 C

[56] References Cited

U.S. PATENT DOCUMENTS

| 3,254,227 | 5/1966 | Hock | 250/235 |
| 3,900,264 | 8/1975 | Heitmann et al. | 356/111 |
| 4,399,358 | 8/1983 | Burkhardt et al. | 250/237 G |
| 4,656,347 | 4/1987 | Une et al. | 250/237 G |
| 4,676,645 | 6/1987 | Taniguchi et al. | 250/237 G |
| 4,820,918 | 4/1989 | Igaki et al. | 250/237 G |

FOREIGN PATENT DOCUMENTS

| 0045321 | 10/1982 | European Pat. Off. |
| 2229996 | 1/1974 | Fed. Rep. of Germany |
| 2729697 | 1/1979 | Fed. Rep. of Germany |
| 1340093 | 12/1962 | France |
| 58-191906 | 11/1983 | Japan |
| 58-191907 | 11/1983 | Japan |

*Primary Examiner*—David C. Nelms
*Attorney, Agent, or Firm*—Fitzpatrick, Cella, Harper & Scinto

[57] ABSTRACT

A device for measuring a relatively moving distance of two relatively moving objects is disclosed. The device includes a plurality of inclined surfaces formed on one of the objects and arrayed with a predetermined pitch along the relatively moving direction, with each of the inclined surfaces being inclined with respect to the relatively moving direction. A measuring portion is provided on the other object for measuring the distance to at least one of the inclined surfaces in a direction having an angle with respect to the relatively moving direction, and a detecting portion detects the relatively moving distance of the two objects on the basis of the measurement by the measuring portion.

35 Claims, 28 Drawing Sheets

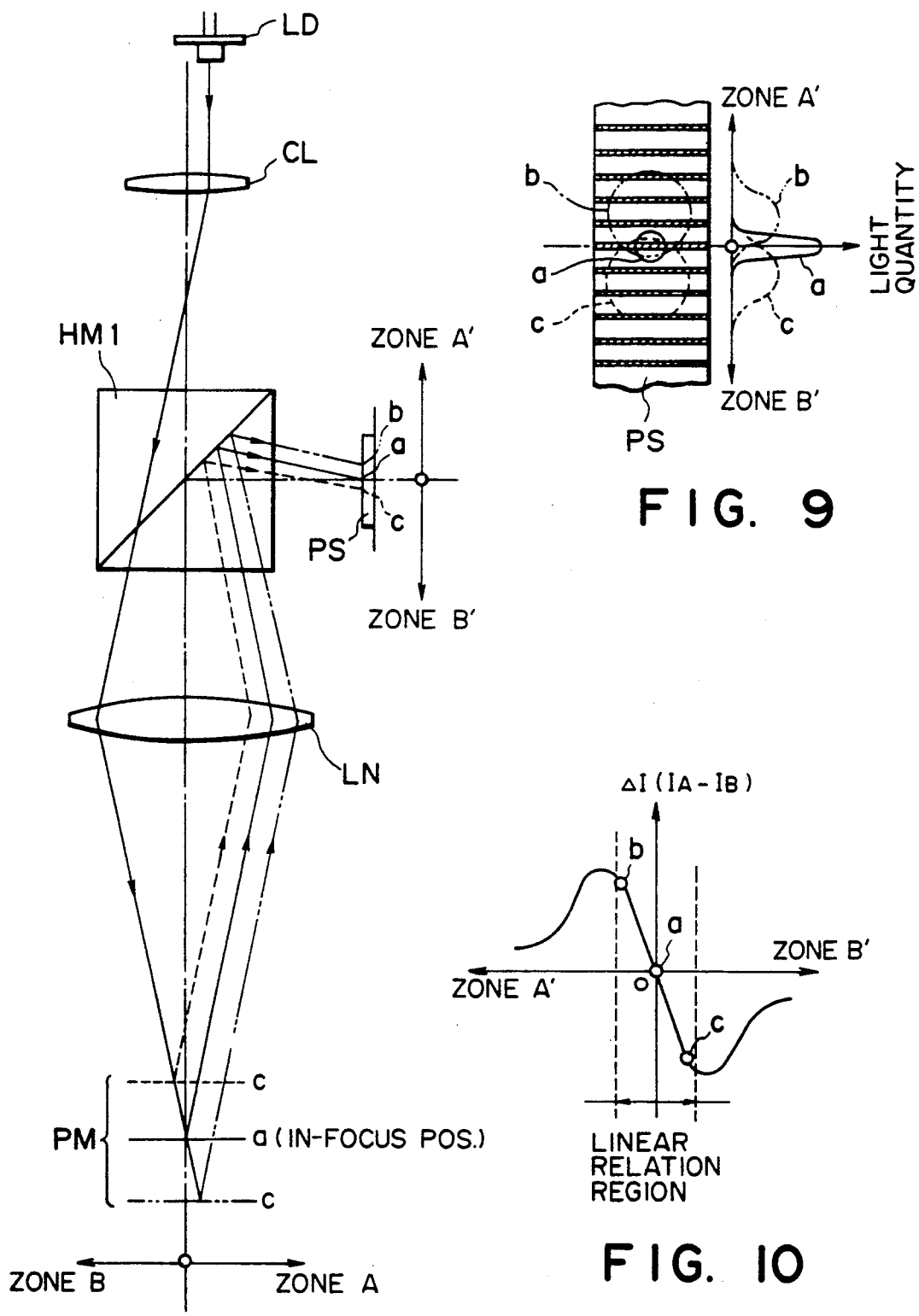

5,122,660

DISTANCE MEASURING SYSTEM UTILIZING AN OBJECT WITH AT LEAST ONE INCLINED SURFACE

This application is a continuation of application Ser. No. 563,689 filed Aug. 3, 1990, which is a continuation of Ser. No. 190,250 filed May 4,1988, all abandoned.

FIELD OF THE INVENTION AND RELATED ART

This invention relates to a distance measuring system having high measuring precision and having a large stroke.

Conventionally, laser interferometers or grating interferometers have been used for high-precision distance measurement. Examples of grating interference type (interferometric) distance measuring system are disclosed in Japanese Laid-Open Patent Applications, Laid-Open Nos. Sho58191906 and Sho58 191907.

With such an interferometer, the measuring stroke can be made relatively large such as of an order of not less than 100 mm. On the other hand, basically, the distance measurement is made by using, as a unit length, a particular pitch which is determined by optical conditions such as the wavelength of measuring light, the order of diffraction light and the state of polarization. Accordingly, the resolution is low and, therefore, the precision is low where a minute distance of an order not greater than submicrons, for example, is to be measured.

In consideration of this, it has been proposed, in a grating interferometer, for example, to electrically divide and process a signal which is determined by the optical conditions such as the order of diffraction light and the state of polarization, to thereby improve the resolution.

However, such electric division leads to a possibility of occurrence of an error due to any change in the quantity of light, any change in the diffraction efficiency and so on.

SUMMARY OF THE INVENTION

It is accordingly a primary object of the present invention to provide a distance measuring device by which at least one of the above-described inconveniences is avoided.

It is another object of the present invention to provide a distance measuring device having high measuring precision and having a large stroke.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 8 is a schematic view explicating the function of an autofocusing distance measuring system used in the FIG. 2 device.

FIG. 9 is a schematic view showing the state of a light spot formed on a position sensor surface in accordance with the position of a plane mirror, and a distribution of light quantity.

FIG. 10 is a characteristic view showing the relationship between a differential signal $\Delta I$ ($=I_A - I_B$) obtainable from the output of the position sensor and the position of the plane mirror (i.e. defocus amount).

DESCRIPTION OF THE PREFERRED EMBODIMENTS

Figure 1:
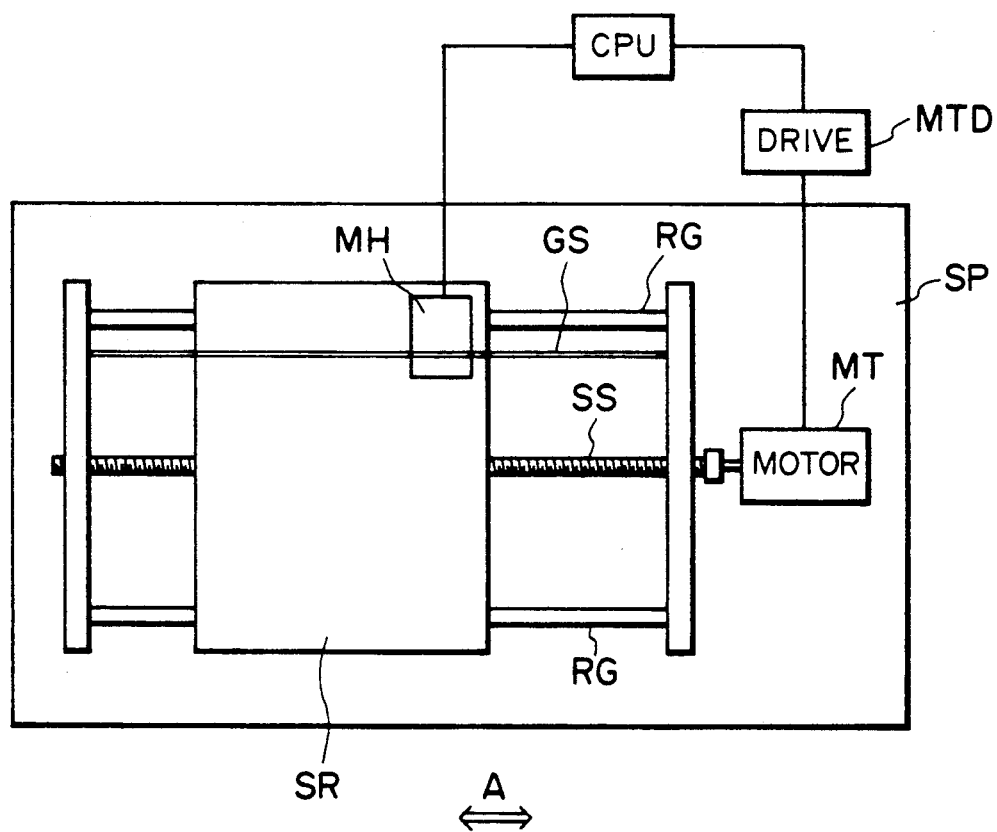
FIG. 1 is a schematic vi a distance measuring device according to an embodiment of the present invention, which is incorporated into a single-axis moving stage.

Referring first to FIG. 1, there is shown a high-precision and high-resolution distance measuring device according to a first embodiment of the present invention, wherein the measuring device is incorporated into a single-axis stage. In this distance measuring device, a grating interferometric distance meter and a focus detecting means usable in an autofocusing device are used in combination, and the interspace between pulse signals which are produced at regular intervals determined by the optical arrangement of the grating interference type distance meter is complemented by use of focus measurement outputs from the focus detecting means, such that the resolution is increased while retaining the high precision of the grating interference type distance meter. As a result, both high precision and high resolution are attainable.

In FIG. 1, denoted at SR is a movable stage; GS, a diffraction grating usable as a reference measure; MH, a measuring head for measuring the amount of movement of the movable stage SR relative to the diffraction grating GS; RG, a pair of guides; SS, a feed screw; MT, a driving motor; and MTD, a motor driver. The guides RG and RG and the diffraction grating GS are fixedly mounted on a surface plate SP so that they extend in parallel to the moving direction of the movable stage SR as denoted by an arrow A. The movable stage SR is movable along the guides RG in the direction of the arrow A by the action of the feed screw SS which is rotationally driven by the motor MT.

Figure 2:
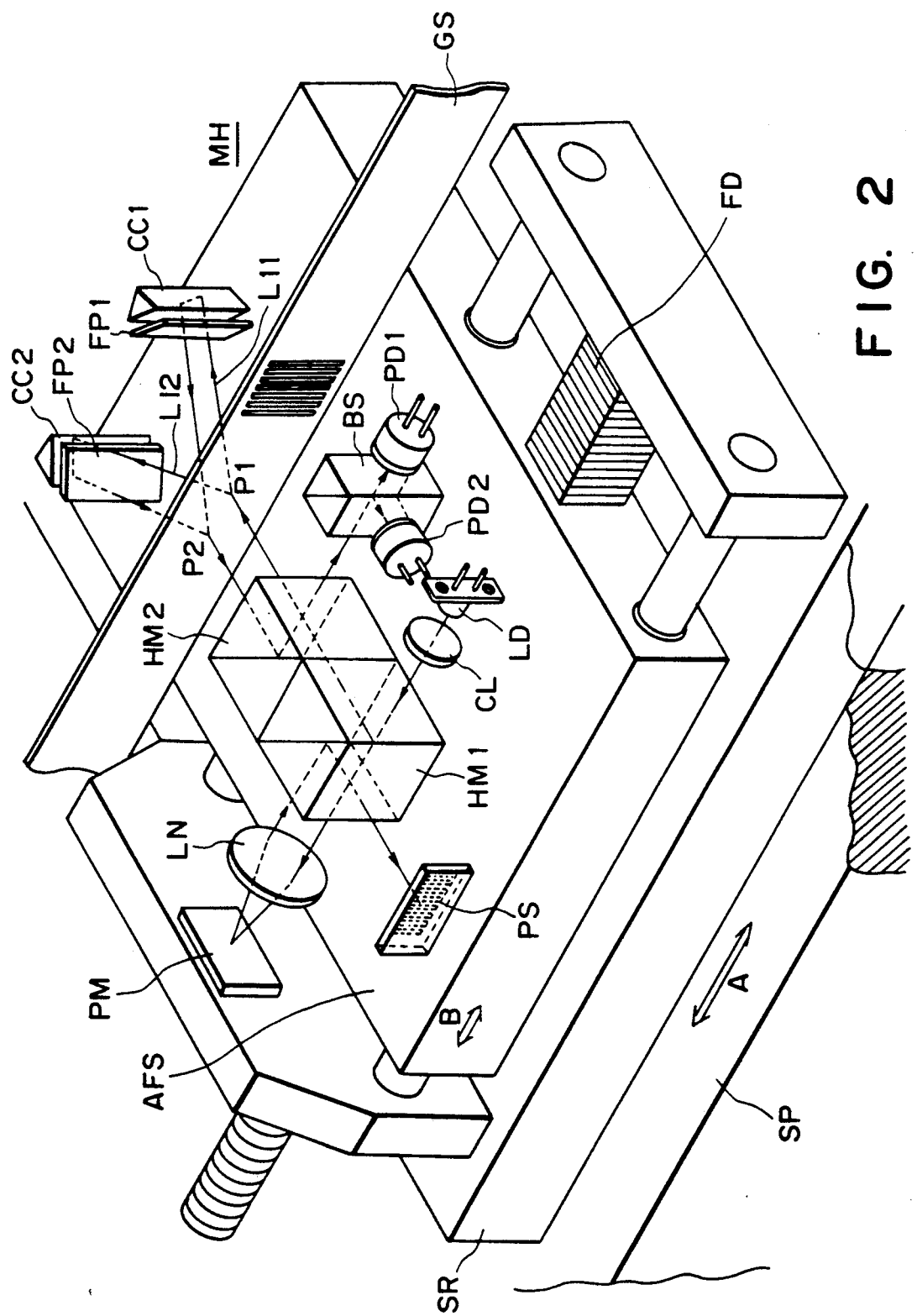
FIG. 2 is a schematic view showing the structure of a distance measuring head used in the FIG. 1 device.

FIG. 2 illustrates details of the structure of the measuring head MH.

In this Figure, the surface plate is depicted at SP and, on this surface plate SP, the movable stage SR is movably supported. Also, the diffraction grating GS is fixedly disposed on this surface plate so that it extends in parallel to the moving direction A of the movable stage SR. Fixedly mounted to the movable stage SR is a plane mirror PM having a mirror surface which is perpendicular to the moving direction A of the stage. Additionally, a fine motion stage (autofocusing stage) AFS is provided on the movable stage SR. The fine motion stage AFS is operationally connected to the movable stage SR by way of a fine motion driving mechanism PD such as a piezoelectric driving mechanism, for example. By means of this fine motion driving mechanism PD, the fine motion stage AFS is made movable through a minute amount relatively to the movable stage SR and in the direction of an arrow B which is the same as the moving direction (the direction of arrow A) of the movable stage SR. Provided on the fine motion stage AFS is a distance measuring optical system, which comprises a grating interference type distance measuring system and an autofocusing distance measuring system.

The distance measuring optical system includes a light source LD which may comprise a semiconductor laser or otherwise; a collimator lens CL; beam splitters HM1 and HM2; phase plates FP1 and FP2; prism mirrors or corner cube prisms CC1 and CC2; a beam splitter BS; photodetectors PD1 and PD2; an objective lens LN; an optical position detector (position sensor) PS and others. The number of optical components is desirably reduced by, for example, commonly using each of the light source LD and the collimator lens CL both for the grating interference type distance measuring system and the autofocusing distance measuring system.

In FIG. 2, a light beam emitted from the light source LD is collimated by the collimator lens CL and then is divided into two by the beam splitter HM1. One of the two split light beams is projected upon the objective lens LN, while the other is projected through the beam splitter HM2 upon the diffraction grating GS.

The light incident on the diffraction grating GS is diffracted thereby, with the result that the phase $\delta$ of the diffraction grating GS is added to the diffraction wave surface. Where the initial phase of the incident light is 0, the phase of the diffraction wave can be expressed by "$\exp[i(\omega t + m\delta)]$", wherein $\omega$ is the optical frequency and m is the diffraction order. For example, positive first-order light and negative first-order light are expressed as "$\exp[i(\omega t + \delta)]$" and "$\exp[i(\omega t - \delta)]$", respectively. The light beam L11 which is the positive first-order light and the light beam L12 which is the negative first order light pass through the phase plates ($\lambda/8$ plates) FP1 and FP2, respectively, and are projected upon the corner cube prisms CC1 and CC2, respectively, by which each incident light beam is reflected in a direction opposite to and in parallel to the direction of incidence. The reflected light beams L11 and L12 pass again the phase plates FP1 and FP2, respectively, in reverse directions. As a result, they are converted into circularly polarized lights, being polarized clockwise and counterclockwise, respectively, and they are diffracted again at a point P2 on the diffraction grating GS which is spaced from a point P1 on the grating in the moving direction (the direction of arrow A) of the movable stage SR. Thereafter, these lights pass through the beam splitter HM2 and, subsequently, are projected upon the beam splitter BS. Each of the light beams L11 and L12 incident upon the beam splitter BS and having circularly polarized characteristics (polarized clockwise or counterclockwise) is divided into two, the split two light beam being transmitted through and reflected by the beam splitter BS, respectively. The transmitted lights $L_{R1}$ and $L_{R2}$ and the reflected lights $L_{S1}$ and $L_{S2}$ then pass through polarizing plates (not shown) whose transmission axes are inclined by 45 degrees with respect to each other, whereby linearly polarized components of them are extracted. Thus, the transmitted lights interfere with each other and are projected upon the photodetector PD1, while the reflected lights interfere with each other and are projected upon the photodetector PD2.

Figure 3:
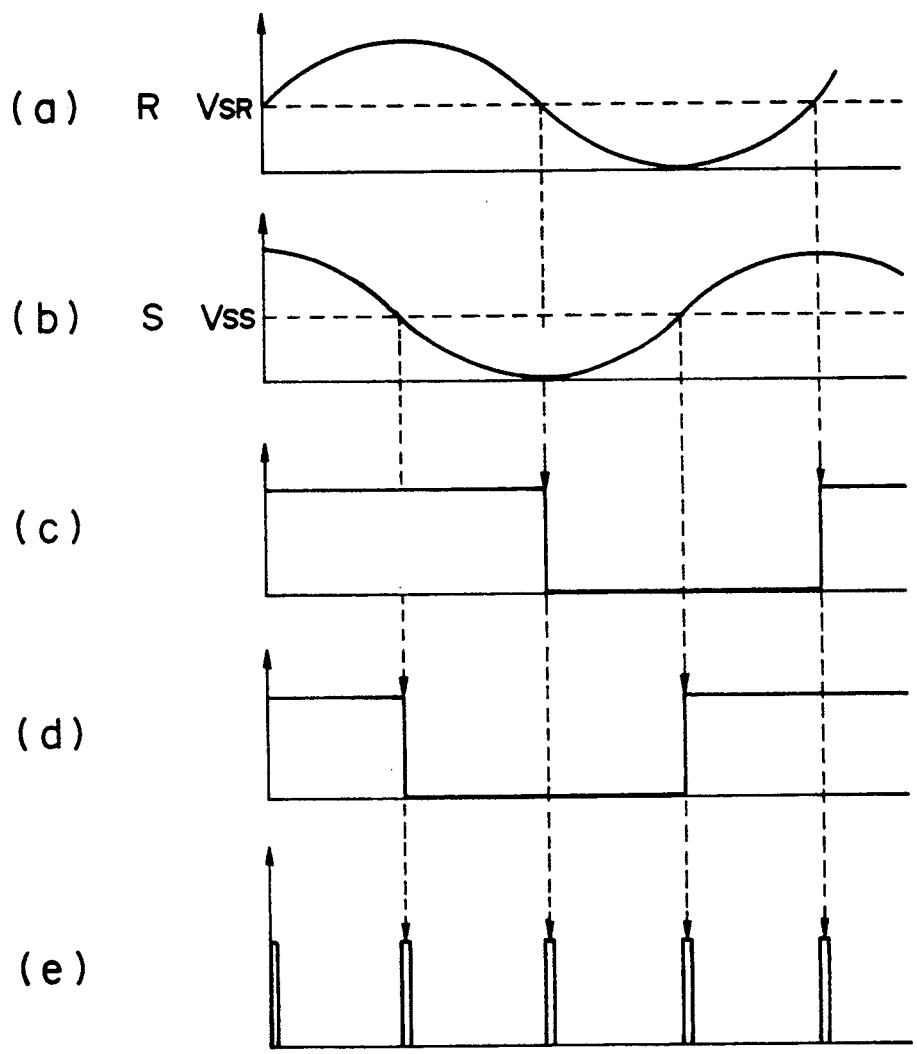
FIGS. 3a, 3b, 3c, 3d, and 3e are a waveform views showing the outputs of photodetectors used in the FIG. 2 arrangement.

Since the photodetectors PD1 and PD2 detect, in terms of the interference light intensity, the polarized components of the two circularly polarized lights with the aid of polarizing plates having transmission axes inclined by 45 degrees relative to each other, the outputs R and S of the photodetectors PD1 and PD2 where the measuring head MH (autofocusing stage AFS) is moved relative to the diffraction grating GS show a phase difference of 90 degrees, such as depicted in two upper parts (a) and (b) of FIG. 3. By use of electric circuits (not shown) and on the basis of a predetermined level, these two signals R and S are binarized (binary-coded) such as depicted in parts (c) and (d) of FIG. 3; and four pulses per one cycle are produced at the timings of rise and fall of the binarized signals, as shown in a part (e) of FIG. 3. By counting the number of pulses, it is possible to measure the amount of relative movement between the measuring head MH and the diffraction grating GS. In this case, for the relative movement of an amount corresponding to one pitch of the diffraction grating GS, the interference light intensity changes through four cycles and, thus, sixteen (16) pulses are produced. Also, at the time of pulse counting, the direction of said relative movement is detected and, in accordance with the result of detection, whether or not the counted number should be added or subtracted is determined. The moving direction can be discriminated from such level of each signal, shown at the parts (c) and (d) of FIG. 3, as created at the timing of generation of each pulse shown at a part (e) of FIG. 3. If, for example, the level of the signal shown in the part (d) as created at the timing of the fall of the signal shown in the part (c) is "high" in an occasion where the movement is in the positive direction, such level become "low" in an occasion where the movement is in the negative or reverse direction.

The signals R and S shown in the parts (a) and (b) of FIG. 3 may be added and subtracted so as to produce signals "R+S" and "R−S" having phase differences of 45 degrees with respect to the signals R and S, respectively; these signals may be binarized in a similar manner so that pulses are produced at the timings of rise and fall. By doing so, it is possible to obtain thirty-two (32) pulses for the movement of an amount corresponding to one pitch of the diffraction grating GS.

Figure 4:
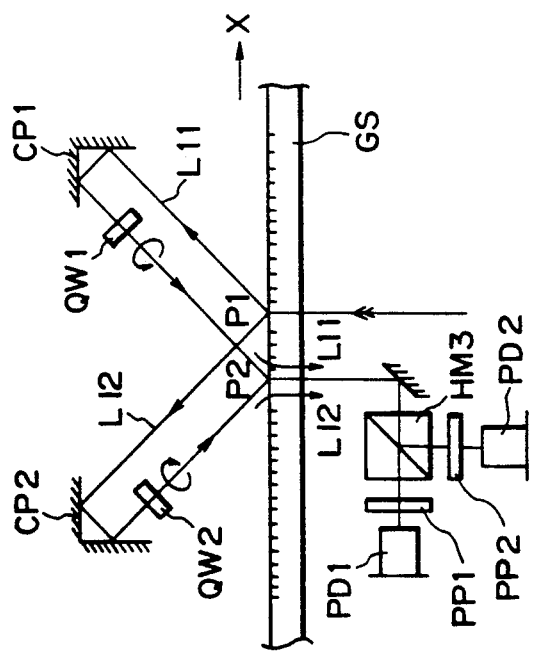
FIG. 4 is a schematic view for explicating the function of a grating interference type distance measuring system shown in FIG. 2.

FIG. 4 is a schematic view explicating the principle of measurement in the grating interference type distance meter used in the present embodiment.

In FIG. 4, a coherent light incident upon the diffraction grating GS is diffracted to provide positive and negative first-order diffraction lights. The phases of these diffraction lights change with the movement of the grating GS and in the direction of the movement. As the diffraction grating GS moves in the X direction by an amount corresponding to one pitch thereof, as shown in this Figure, the phase of the positive first-order diffraction light L11 advances by an amount corresponding to one wavelength, while the phase of the negative first-order diffraction light L12 retards by an amount corresponding to one wavelength. These diffraction lights L11 and L12 are reflected backwardly by corner cubes CP1 and CP2. As they are diffracted again by the grating GS, the phase of the positive first-order diffraction light L11 advances further by an amount corresponding to one wavelength, while the phase of the negative first-order diffraction light L12 retards by an amount corresponding to one wavelength. Accordingly, as the diffraction grating GS moves through one pitch thereof, the interfering light formed as a result of finally combining the lights L11 and L12 shows brightness and darkness change of four times (i.e. four brightness peaks are shown). Accordingly, if one pitch of the diffraction grating is 1.6 micron, there occurs a brightness and darkness change per the movement of an amount corresponding to the quarter (¼) of 1.6 micron, namely per the movement through 0.4 micron. By photoelectrically converting these brightness and darkness changes and by counting them, pulses are obtainable each being produced for the movement through 0.4 micron. In this interference type distance measuring system of the FIG. 2 example described above, and in order to further improve the resolution, electrical processing may be made as desired so that either sixteen (16) or thirty-two (32) pulses are produced per one pitch of the diffraction grating. Namely, one pulse can be produced for each movement through either 0.1 micron or 0.05 micron.

Next, description will be made of the manner of detecting the direction of the grating interference type distance meter.

In order to detect the distance measuring direction, it is necessary to extract two signals having therebetween a phase difference of 90 degrees.

When, as shown in FIG. 4, a linearly polarized coherent light is projected upon a quarter waveplate QW1 or QW2 with an angle of 45 degrees with respect to the fast axis thereof and then is passed through the quarter waveplate, the light can be transformed into a circularly polarized light.

If a positive first-order diffraction light and a negative first-order diffraction light are transformed into, e.g., circularly polarized lights being polarized counterclockwise and clockwise, respectively, and if they are combined, then the combined light becomes a linearly polarized light.

The direction of polarization of such a linearly polarized light is determined by the phase difference $\phi$ between the positive and negative first-order diffraction lights.

If a circularly polarized light, being polarized counterclockwise, obtained from a positive first-order diffraction lights is expressed by:

$$y_- = a \exp\{i(\omega t - \phi/2)\}$$

$$x_+ = a \exp\{i(\omega t - \pi/2 - \phi/2)\}$$

and if a circularly polarized light, being polarized counterclockwise, obtained from a negative first-order diffraction light is expressed by:

$$y_- = a \exp\{i(\omega t + \phi/2)\}$$

$$x_- = a \exp\{i(\omega t - \pi/2 + \phi/2)\}$$

then, the plane wave obtained by combining these lights can be expressed as follows:

$$y = y_+ + y_- = a(\exp(i\phi/2) + \exp(-i\phi/2))$$

$$x = x_+ + x_- = a(\exp(i\phi/2) - \exp(-i\phi/2))$$

Figure 5:
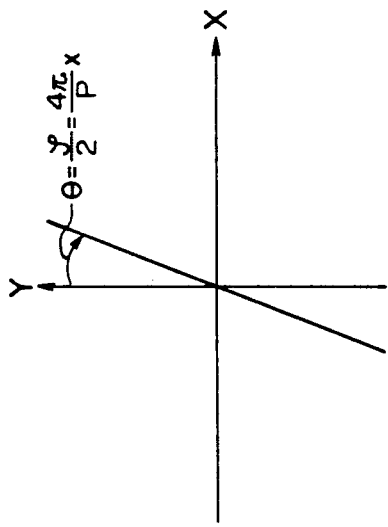
FIG. 5 is a view explicating the rotation of the direction of polarization of the detected light in the structure of FIG. 4.

Thus, it is seen that, as shown in FIG. 5, the resultant light is a linearly polarized light whose direction of polarization (i.e. $\theta$) is equal to $\phi/2$.

In the above equations, a is the amplitude of a light wave and $\omega$ is the angular frequency of the light wave.

It is seen therefrom that, where the pitch of the grating GS is denoted by p, the movement of the grating GS through a distance x will cause a phase difference $\phi$ between the positive and negative first-order diffraction lights, which difference can be expressed as follows:

$$\theta = 2\pi\{x/(p/4)\} = (8\pi/p)x$$

Therefore, the direction of polarization $\theta$ of the combined wave of the positive and negative first-order diffraction lights is given by the following equation:

$$\theta = (4\pi/p)x$$

The combined wave of this linearly polarized light is separated into two by a beam splitter HM3, as shown in FIG. 4, and the split lights are passed through polarizing plates PP1 and PP2 and, thereafter, are incident upon detectors PD1 and PD2, respectively. If there is provided a difference of 45 degrees between the transmission axes of the two polarizing plates PP1 and PP2 and where, for example, the detector PD1 disposed after the first polarizing plate PP1 detects a maximum light quantity when $\theta = 0$, the quantity of light upon the detector PD2 disposed after the second polarizer PP2 becomes maximum when the following condition is satisfied:

$$\pi/4 = (4\pi x)/ps$$

namely, $$x = p/16 = (p/4) \cdot (\tfrac{1}{4})$$

Thus, the signal from the detector PD2 has a phase difference of 90 degrees as compared with the signal from the detector PD1 produced with the aid of the first polarizer. Accordingly, it is possible to discriminate the measuring direction.

Next, description will be made of the manner of obtaining pulse signals with higher reproducibility (precision of repetition).

As will be described later, the precision (resolution) of the distance meter of the FIG. 1 embodiment is, for example, of an order of 0.01–0.002 micron. In order to best utilize the advantage of the high precision of this autofocusing distance measuring system, it is necessary that pulse signals having high repetition precision are produced in the interference type distance measuring system. More specifically, the repetition precision not greater than 0.002 micron, which is the precision resolvable by the autofocusing, is required.

In a system wherein the number of pulses per one pitch of a grating is increased by electric processing, as described hereinbefore, the factors causing deterioration of the precision are the change in the light quantity, the change in the diffraction efficiency and so on. If, for example, there occurs a change in a DC level or a change in the amplitude, in the signals R and S such as shown in the parts (a) and (b) of FIG. 3, the slicing position $V_{SR}$ or $V_{SS}$ changes with a result of deterioration of the repetition precision.

In consideration of this, the inventors propose use of signals having a phase difference of 180 degrees, namely such signals having inverted phases.

Figure 6:
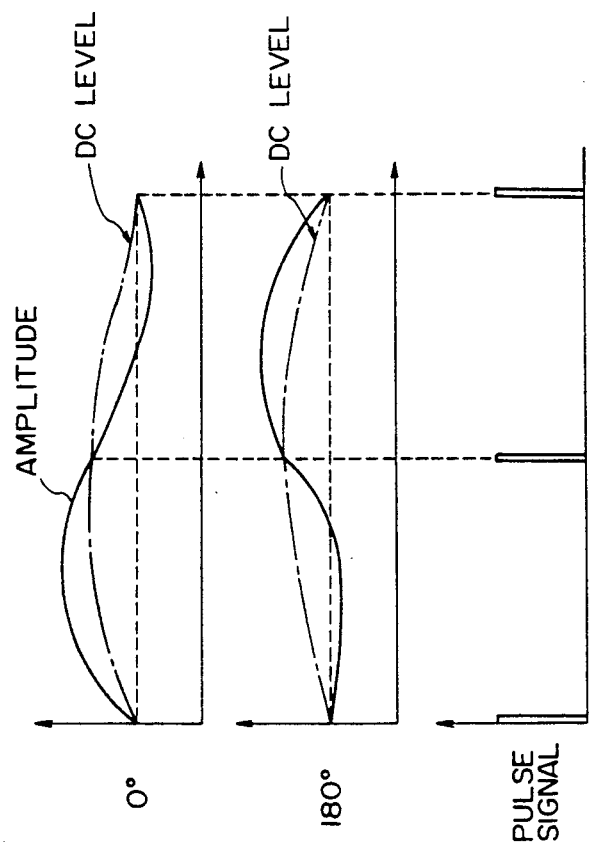
FIG. 6 is a waveform view showing signals having phases of 0 degree and 180 degrees, in the structure of FIG. 4.

Since any change in the DC level or any change in the amplitude is, usually, common to two signals of a phase of "0 degree" and a phase of "180 degrees", such a change can be cancelled by detecting the difference between these signals having a phase difference of 180 degrees. FIG. 6 shows this.

In FIG. 6, an upper part shows an interference light intensity signal at a predetermined polarization plane; a middle part shows an interference light intensity signal having a phase difference of 180 degrees with respect to the signal shown in the upper part; and a lower part shows pulse signals each being produced per a half of the wavelength obtainable from these two signals. Depicted by dash-and-dot lines in the upper and middle parts of FIG. 6 are DC levels of these signals. As illustrated, if the DC level changes, the change in the DC level in one of the two signals is the same as that in the other signal. Therefore, a difference signal of the two signals is not affected by such a change. Since the difference between two signals, whose phases are inverted with respect to each other, becomes null for each half wavelength. Thus, by producing a pulse signal each time the difference signal becomes null, those signals as illustrated in the lower part of FIG. 6 are obtainable.

Where signals of phases "0 degree" and "180 degrees" are used, one pulse signal is produced for each half wavelength. In this case, pulse signals are produced at intervals of 0.2 micron.

Figure 7:
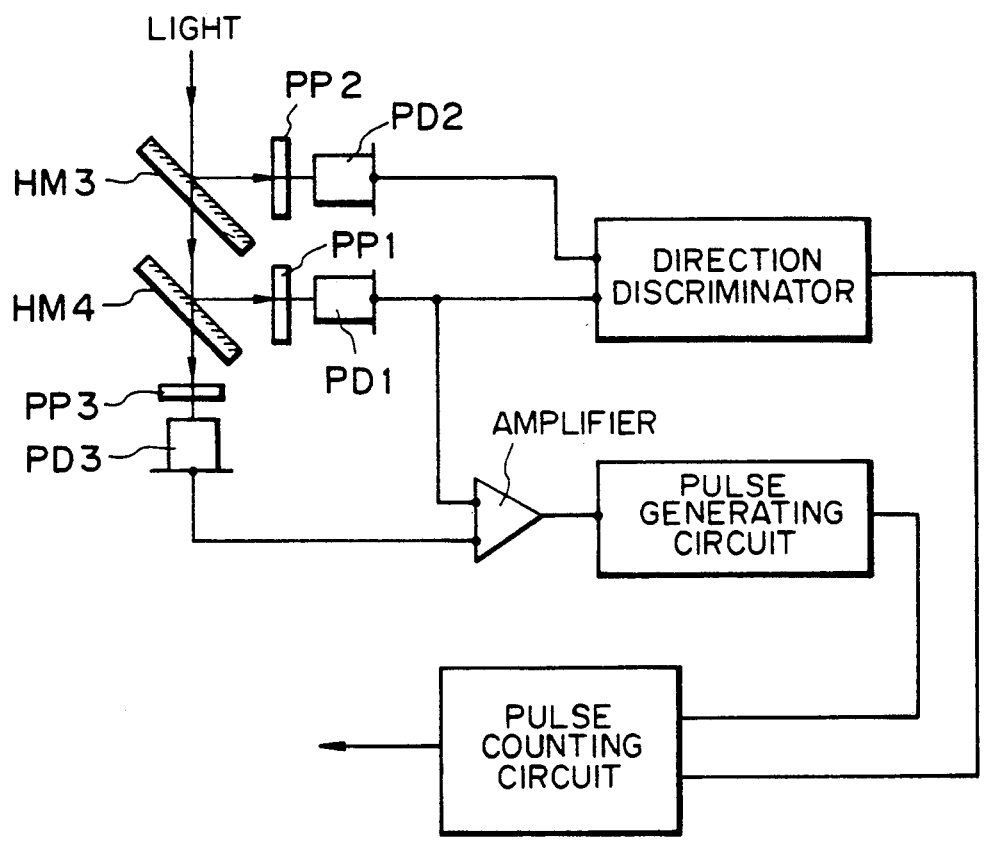
FIG. 7 is a schematic and diagrammatic view exemplifying an arrangement for extracting signals having phases of 0 degree and 180 degrees, in the structure of FIG. 4.

FIG. 7 exemplifies an arrangement for embodying the above-described method. It will be understood from FIG. 7 that a possible way is to provide, in addition to two polarizing plates PP1 and PP2 having azimuth angles of 0 degree and 45 degrees, respectively, a third polarizing plate PP3 having an azimuth angle of 90 degrees which may be disposed on a branched optical path. In FIG. 7, denoted at HM3 and HM4 are half mirrors; and at PD1, PD2 and PD3 are detectors (photosensors).

Referring back to FIG. 2, the light which is emitted from the light source LD and collimated by the collimator lens CL and, then, passed through the beam splitter HM1, enters into the objective lens LN of the autofocusing distance measuring system.

FIG. 8 is a schematic view for explicating the operation of the autofocusing distance measuring system.

In FIG. 8, the light from the light source LD is incident on the objective lens LN at a position which is deviated from the principal optical axis thereof. When the target of the objective lens LN (i.e. the mirror surface of the plane mirror PM fixed to the movable stage SR shown in FIG. 2) is at an in-focus position (a), the light from the light source LD travels along a path shown by a solid line in FIG. 8 and forms an image of a light spot, projected upon the mirror surface, at the center (a) on the sensor PS surface which is disposed at an optically conjugate position (imaging position) of the in-focus position (a) with respect to the objective lens LN. When the target PM is at a defocused (unfocused) position of the objective lens LN as denoted at (b) or (c), the light from the light source travels along a path as depicted by a dash-and-dots line or a broken line in FIG. 8 and forms a defocused image on the sensor PS at a position (b) or (c) which is spaced from the center (a) of the sensor PS.

FIG. 9 shows light spots and light quantity distributions on the sensor PS surface, corresponding to the positions (a–c) of the plane mirror PM. The difference between the magnitude of the sensor signal in a zone A on the sensor PS surface and the magnitude of the sensor signal in another zone B shows so-called "S-shaped curve" characteristics. FIG. 10 shows the relation of a differential signal $\Delta I$ which concerns the sensor signal magnitudes ($I_A$ and $I_B$) and is obtainable by a differential amplifier (not shown), wherein $\Delta I = I_A - I_B$, with respect to the amount of defocus (the position of the target). The autofocusing measuring system of the FIG. 2 example utilizes such region of the S-shaped characteristic curve in which the defocus amount and the differential signal $\Delta I$ are in a substantially linear relation.

Figure 11:
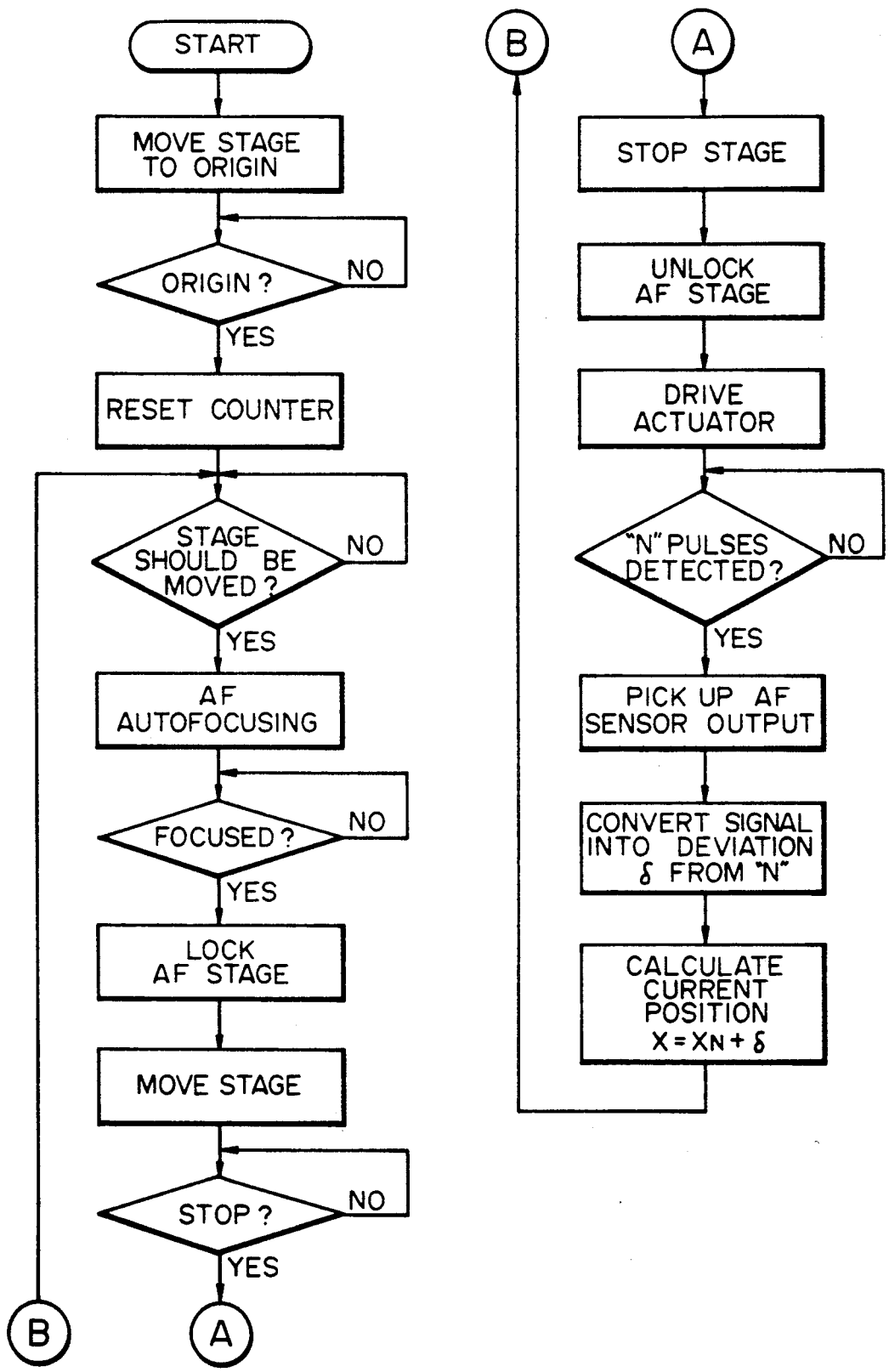
FIG. 11 is a flow chart showing the operation of the distance measuring device of the FIG. 1 embodiment.

Referring now to a flow chart of FIG. 11 and output waveform views of FIGS. 12 and 13, the operation of the distance measuring system shown in FIGS. 1 and 2 will be described in detail. The distance measuring system of FIG. 1 is arranged so that the operation as a whole is controlled under the influence of a central processing unit (CPU).

Upon start of the operation such as at the time of start of the power supply, the movable stage SR is moved back to its origin. When the movable stage SR comes to the origin, the counter is reset. By this, the system becomes ready for the application of a movable stage driving instruction signal.

When, in this state, the stage driving instruction signal is supplied, the autofocusing operation is first effected. More specifically, on the basis of an output of the autofocusing distance measuring system, the autofocusing stage AFS is driven by means of the piezoelectric fine motion driving mechanism (piezoelectric actuator) so that the objective lens LN is correctly focused on the plane mirror PM. When the in-focus state is established, the autofocusing stage AFS is locked at that position to the movable stage SR and, thereafter, the movable stage SR is driven by the motor MT.

Figure 12:
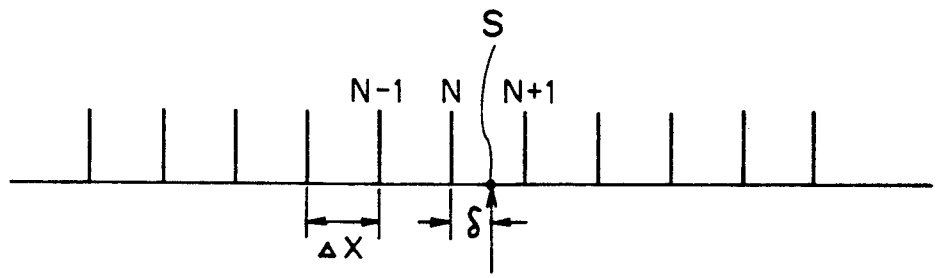
FIG. 12 is a characteristic view showing output signals of a grating interference type distance measuring system used in the distance measuring device of FIG. 1.
Figure 13:
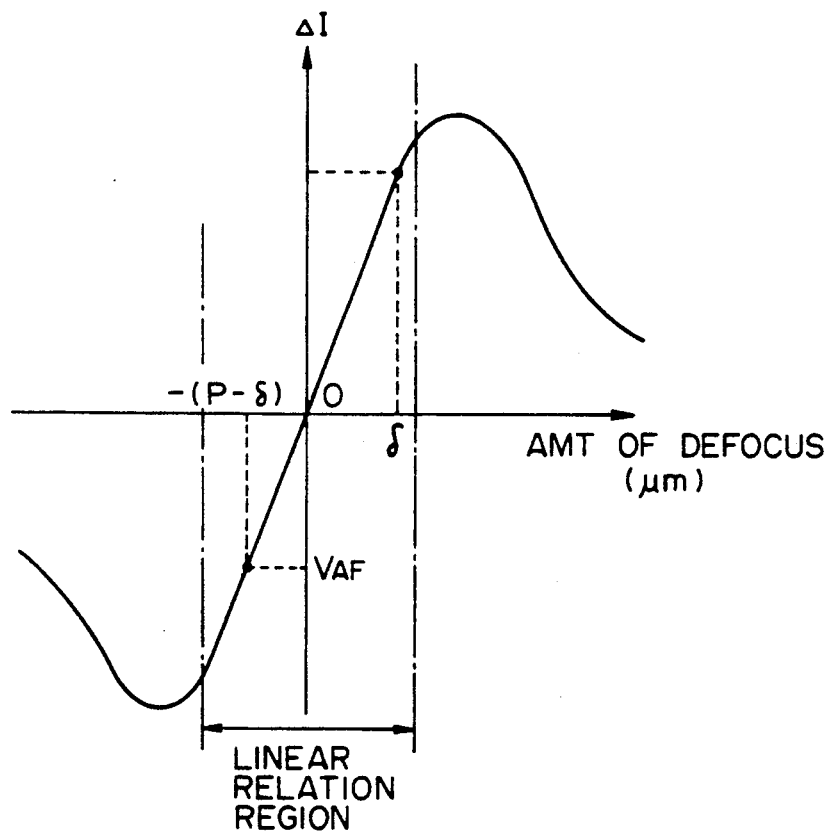
FIG. 13 is a characteristic view showing an output signal of an autofocusing distance measuring system used in the distance measuring device of FIG. 1.

In this distance measuring system and as the movable stage SR moves, as described hereinbefore, a pulse signal is outputted from an electric circuit (not shown) of the grating interference type distance measuring system, per one-sixteenth (1/16) of the pitch p of the diffraction grating GS which is fixed with respect to the surface plate SP (see FIGS. 3 and 12). The counter operates to integrate the number of pulses.

The central processing unit, when it receives a stop instruction during the movement of the movable stage SR, operates to stop the motor MT with the aid of the motor driver MTD to stop the movable stage SR, and operates to read the integrated number of pulses obtained by the counter. Thereafter, the autofocusing stage AFS is unlocked. Then, the piezoelectric actuator FD is driven by a driver, not shown, so as to move the autofocusing stage AFS, carrying thereon the autofocusing system and the grating interference type optical system, and to detect which position, between the obtained pulse signals of the grating interference type distance measuring system, the movable stage has come to. That is, if the movable stage SR is stopped at a point S and the counted number of pulses at this time is N, the autofocusing means is used to determine, with high precision, which position between the N-th pulse and (N+1)-th pulse the stop point S assumes.

First, the integrated pulse number as counted by the counter at the time when the movable stage SR stops is stored and, then, the piezoelectric actuator FD is driven to move the autofocusing stage AFS, namely the distance measuring optical system MH, by a minute amount (of an amount slightly greater than the pulse spacing $\Delta x$) and in a direction opposite to the preceding moving direction. As a result of this, the amount of defocus of the autofocusing distance measuring system having, as a target, the plane mirror PM which is fixedly mounted with respect to the movable stage SR, is changed so that the differential output signal $\Delta I$ (i.e. the difference signal $I_A - I_B$ of the autofocusing sensor PS) changes as depicted in FIG. 13. At this time, the amount of feeding by the piezoelectric drive is preferably set within the range of region in which the defocus amount and the difference signal shows a linear relation. This is desirable because the relation between the difference signal and the defocus amount is predetected, so that the defocus amount can be definitely determined once the difference signal is applied. Therefore, by moving the stage by a minute amount and by means of the piezoelectric drive to such position that corresponds to the N-th pulse, it is possible to obtain a difference signal at the position corresponding to the N-th pulse. The thus obtained difference signal can be transformed into a defocus amount $\delta$ and, accordingly, the position of the point S at which the movable stage SR is stopped can be represented by a value obtainable by adding $\delta$ to the position of generation of the N-th pulse (i.e. N·$\Delta x$) wherein $\Delta x$ is the pulse interval of the pulse train of the grating interference type distance measuring system. It should be noted that, until the movable stage SR is stopped, the fine motion stage AFS carrying thereon the optical system is held stationary at the position (in-focus position) at which the autofocusing signal is null.

If, in this distance measuring system, the grating pitch of the diffraction grating GS is 1.6 micron, the interval of the pulse signals of the grating interference type distance measuring system becomes 0.1 micron. Accordingly, by setting the amount of piezoelectric drive within the range of about 0.2 micron, the above-described method is made practicable. Therefore, while retaining a large stroke of the grating interference type distance measuring system, the distance measurement is attainable with the precision of the autofocusing. As a result, the positioning of a movable stage, for example, can be made with high precision.

For example, the precision of the auto-focusing distance measurement can be of an order of 0.01–0.002 micron where an autofocusing objective lens of "x100" (NA $\approx 0.9$) is used and a CCD sensor, a position sensor or otherwise is used as the auto-focusing sensor PS. In this case, the linear relation region of the autofocusing signal has an extent of an order of 1 micron.

In the distance measuring system of the FIG. 1 embodiment, the autofocusing optical system should not always be arranged so that the plane mirror PM position and the autofocusing sensor PS position are placed in an imaging (conjugate) relation. It is only necessary that the differential signal of the auto-focusing sensor or the light spot position signal (the defocus amount with respect to the moving direction) shows linear or approximately linear characteristics. If linear characteristics are not shown, the relationship between the amount of movement (defocus amount) and the signal may be preparatorily stored into a read only memory (ROM) so that the amount of minute movement can be detected by reading the amount of movement corresponding to the detected signal.

In the distance measuring system of the FIG. 1 embodiment, as described hereinbefore, a distance measuring means having a large stroke is used in combination with an optical system wherein a signal output has a substantially linear relation with respect to the amount of movement, by which the interspace between signals (resolution) of the distance measuring means having a large stroke can be complemented. As a result, the precision of the large-stroke distance measuring means can be improved significantly.

This leads to an advantage of avoiding the problem that errors are easily caused by any change in the light quantity or in the diffraction efficiency, which problem occurs in when a signal determined by the optical conditions such as the order of diffraction light, the state of polarization or otherwise is electrically divided and processed so as to increase the resolution.

The distance measuring system of the FIG. 1 embodiment can be modified in the following points.

For example, when the defocus amount $\delta$ is going to be detected, the autofocusing stage AFS may be moved by minute amounts sequentially to the position corresponding to the N-th pulse and to the position corresponding to the (N+1)-th pulse; and the difference signals a and b at these positions may be detected. By substituting the pitch p of the pulses into equation "$\delta = (a/|b-a|) \times p$", the defocus amount $\delta$ can be calculated. As long as the signal outputs are linear between the two pulses, the defocus amount $\delta$ can be detected correctly even if the autofocusing sensor outputs varies. The large-stroke distance measuring means is not limited to the grating interference type distance meter. A laser interferometric distance meter or otherwise may be used.

The optical system placed on the fine motion stage may comprise only an objective lens of the autofocusing system and the optical elements of the grating interference type distance meter. It is not necessary that all the components of the autofocusing system are placed on the fine motion stage.

While the FIG. 1 embodiment is an example applied to the measurement with regard to single-axis movement, it is also applicable to the measurement with regard to dual-axis movement or otherwise by using compound structure.

In FIG. 2, the autofocusing system is of a TTL (through the lens) type. However, it may be provided by an autofocusing system usable in an optical pickup for a digital audio disk (DAD) or a video disk, or an autofocusing system usable in a photographic camera.

The distance measuring held MH may be fixed to the stage SR and the diffraction grating GS may be made movable relative to the surface plate SP. Additionally, the autofocusing system may be separated from the distance measuring head MH and disposed at such location at which the autofocusing system can measure the distance of movement of the diffraction grating relative to the surface plate SP. After the movement of the stage SR, the diffraction grating GS may be moved and the amount of movement, made until the pulse is detected, may be detected by the autofocusing system.

As described hereinbefore, it is not always necessary that the autofocusing system is in an imaging relation. What is required is only that the sensor signal output is approximately linear. In a system wherein the light spot moves linearly on the sensor surface, the point on the plane mirror surface (shown in FIG. 2) and the sensor surface may not be in a conjugate relation.

Figure 14:
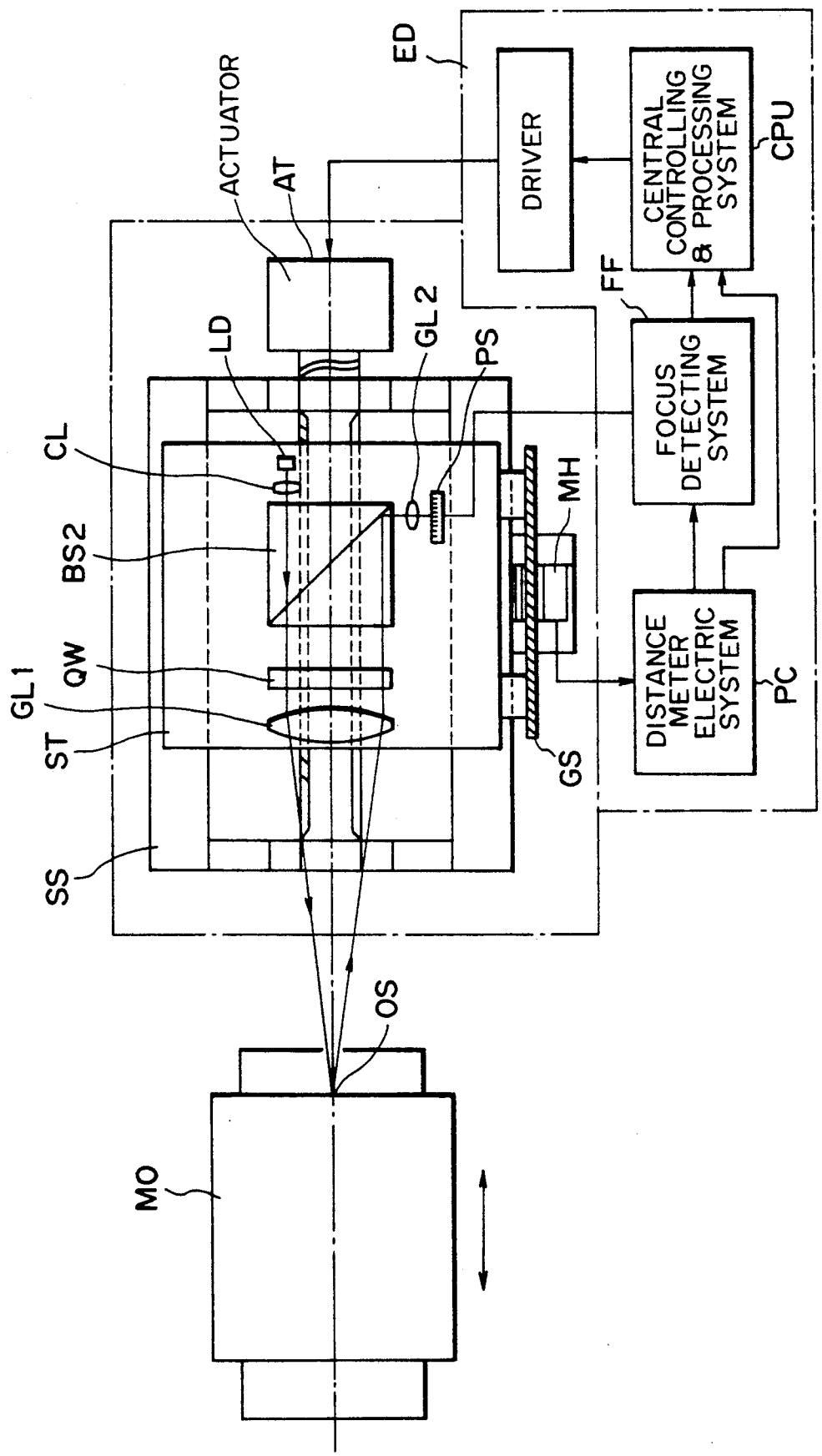
FIG. 14 is a schematic and diagrammatic view showing an embodiment wherein the components of the distance measuring device are assembled as a distance measuring unit.

FIG. 14 shows an example wherein a distance measuring system according to an embodiment of the present invention is formed into a distance measuring unit.

In this distance measuring unit, an autofocusing means which comprises a light source LD, a collimator lens CL, a polarization team splitter HM1, a quarter waveplate QW, condensing lenses GL1 and GL2 and an optical position detecting sensor PS (comprising a charge coupled device or otherwise) is disposed on a stage movable portion ST. Additionally, the movement of the stage movable portion ST is detected, in terms of a pulse train signal, by means of a linear grating GS fixed to the stage movable portion ST and a reading head MH provided on a stage stationary portion SS.

The stage movable portion ST is moved by means of an actuator AT. Object MO being examined has a measurement reference plane OS which is formed by a mirror surface having high surface precision.

One of the most important features of this example is that, in a detection and processing circuit ED, each time a focus detecting circuit FF receives a pulse signal from a pulse train distance measuring electric system PC, the autofocusing output value at that time is renewed and stored.

Figure 15:
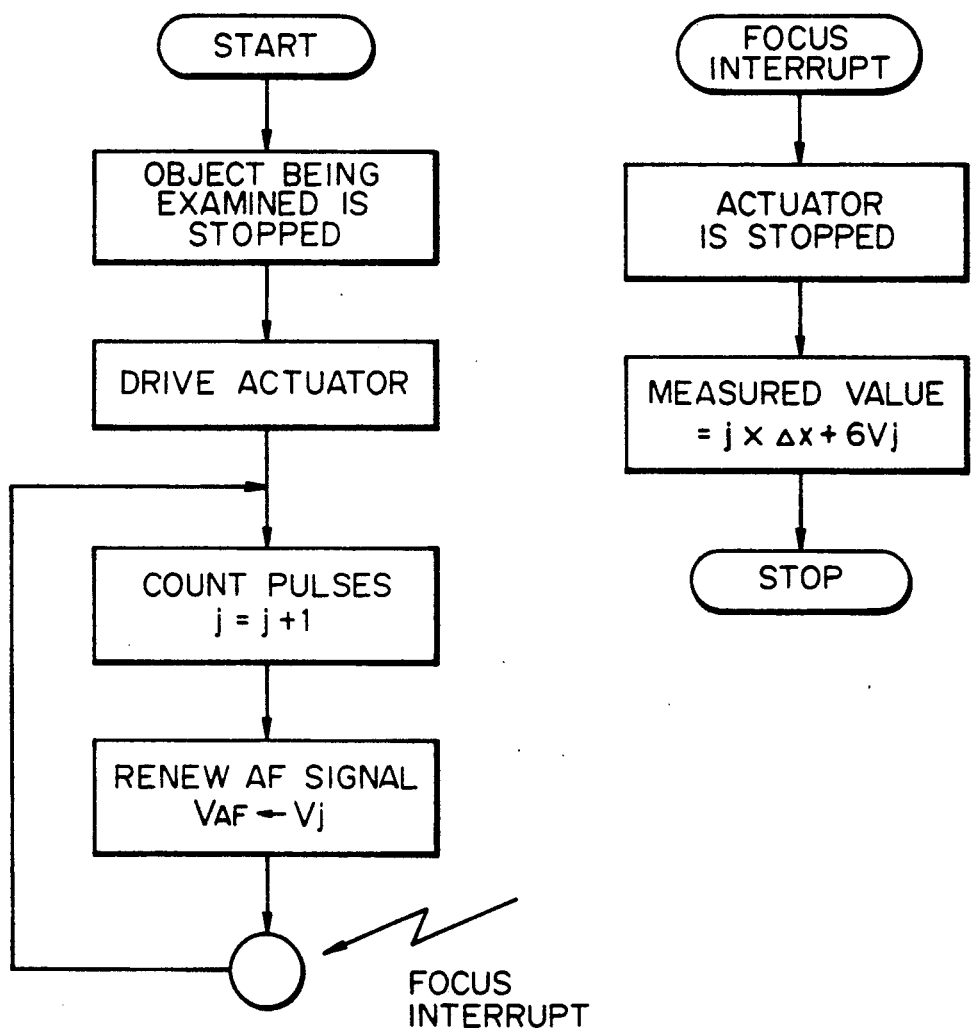
FIG. 15 is a flow chart showing the operation of the distance measuring unit of the FIG. 14 example.
Figure 16:
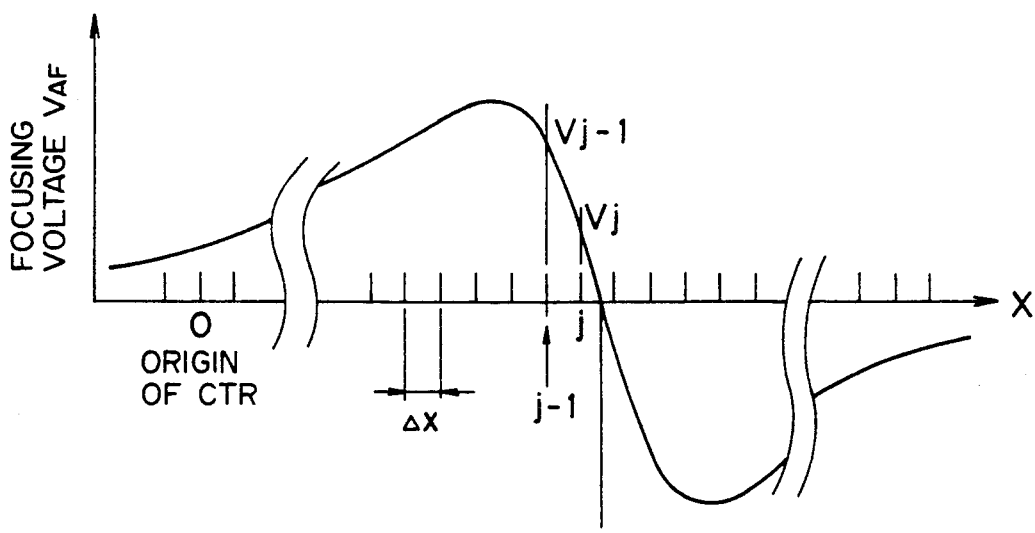
FIG. 16 is a characteristic view showing the relationship between grating interferometric distance measuring pulse signals and the autofocusing distance measuring output voltage, in the distance measuring unit of FIG. 14.

FIG. 15 shows the flow of such an operation Also, FIG. 16 exemplifies the pulse spacing and an autofocusing electric voltage.

When the stoppage of the object MO is discriminated, the actuator AT of the distance measuring unit drives so as to bring the autofocusing system into correct focus with respect to the reference plane OS. Such movement is measured by detecting changes in the quantity of the interference light by use of the scale GS and the reading head MH and by counting, in terms of pulse signals the changes in the light quantity by use of the pulse train distance measurement electric system PC. The resolution in this case is equal to the pulse spacing $\Delta x$ (FIG. 16).

Each time a central processing unit CPU receives a pulse signal, the focusing voltage $V_{AF}$ at that time is renewed and stored. When the autofocusing system provides an in-focus signal, namely $V_{AF} = 0$ V, the actuator AT stops.

Then, in the central processing unit CPU, the number j of the pulses having been counted and the focusing voltage Vj last stored by the focus detecting system FF are used to calculate the distance x, by the following equation:

$$x = j \cdot \Delta x + V j \cdot \xi$$

wherein $\Delta x$ is the moving distance corresponding to the pulse spacing, and it is 0.4 micron pitch, for example, and $\xi$ is an output-distance coefficient having been preparatorily calibrated wtih respect to the sensitivity of the autofocusing system.

Figure 17:
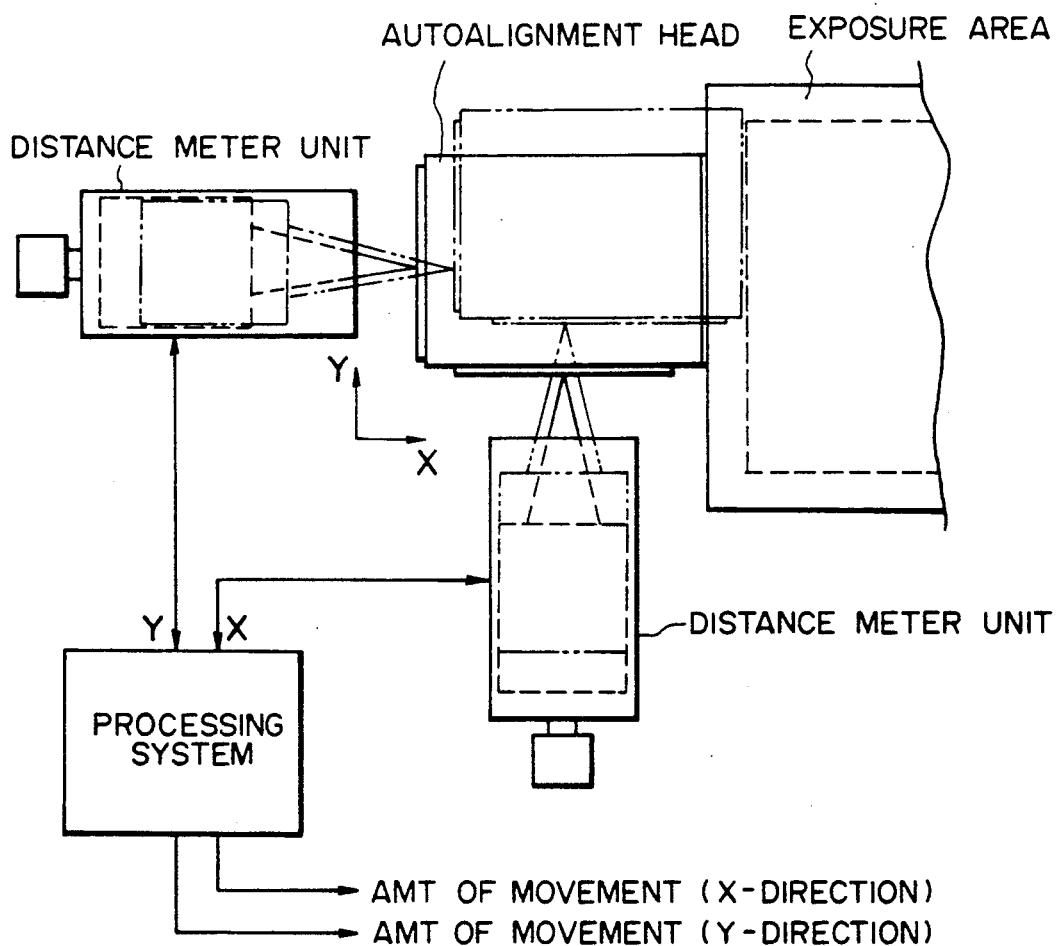
FIG. 17 is a schematic and diagrammatic view of an embodiment wherein plural distance measuring units each of the type shown in FIG. 14 are used with a dual axis moving device.

FIG. 17 shows an example wherein two distance measuring units of the type described just above are incorporated into a dual-axis moving device. In this example, these distance measuring units are used for high-precision positioning of an autoalignment head of a semiconductor device manufacturing exposure apparatus.

Figure 18:
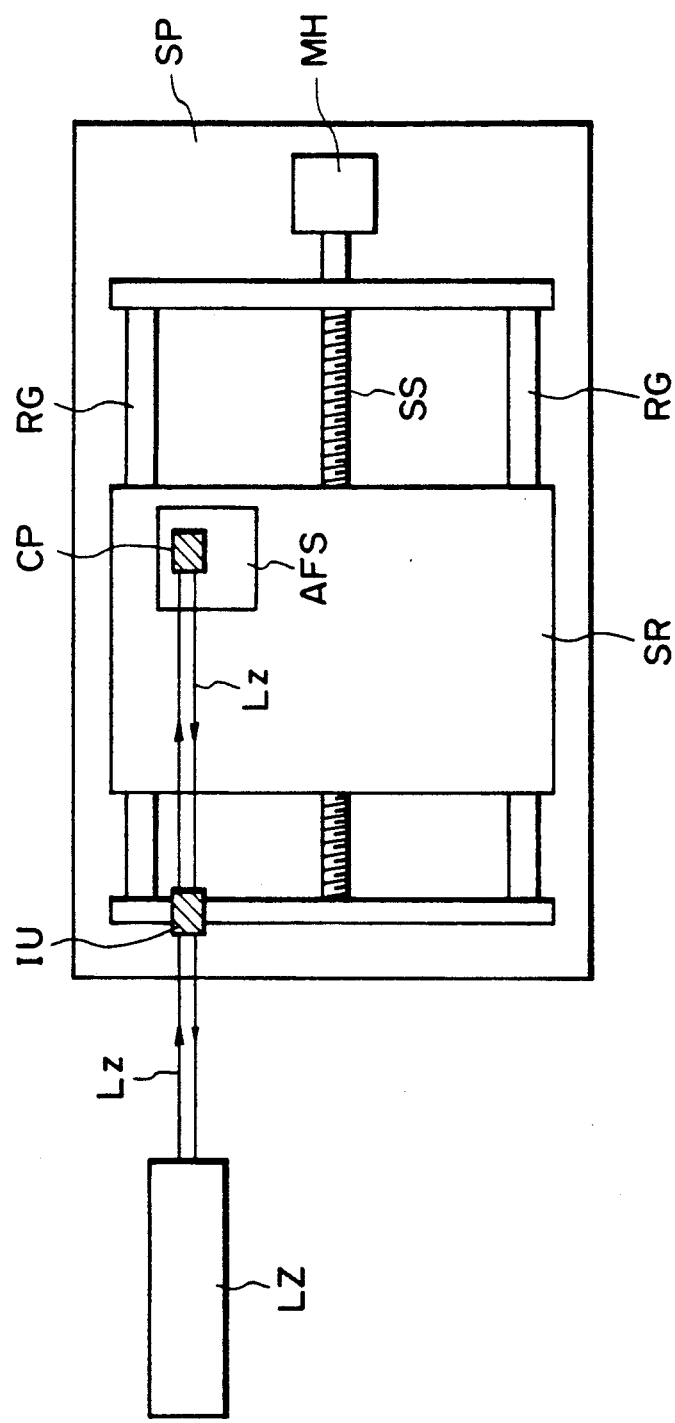
FIG. 18 is a schematic view of another embodiment of the present invention, wherein a laser interferometric distance measuring system is used as an interference type distance measuring system.

FIG. 18 shows an example wherein the diffraction grating interference type distance measuring system of the distance meter used in the FIG. 1 example is replaced by a laser interferometric distance measuring system.

In FIG. 18, same reference characters as those used in FIG. 1 are assigned to corresponding or similar elements. In the FIG. 18 example, a laser head LZ, an interference unit IU and a corner cube prism CP constitute a laser interferometric measuring system. The interference unit IU is fixed to a surface plate SP, while the corner cube prism CP is fixed to a fine motion stage AFS.

Figure 19:
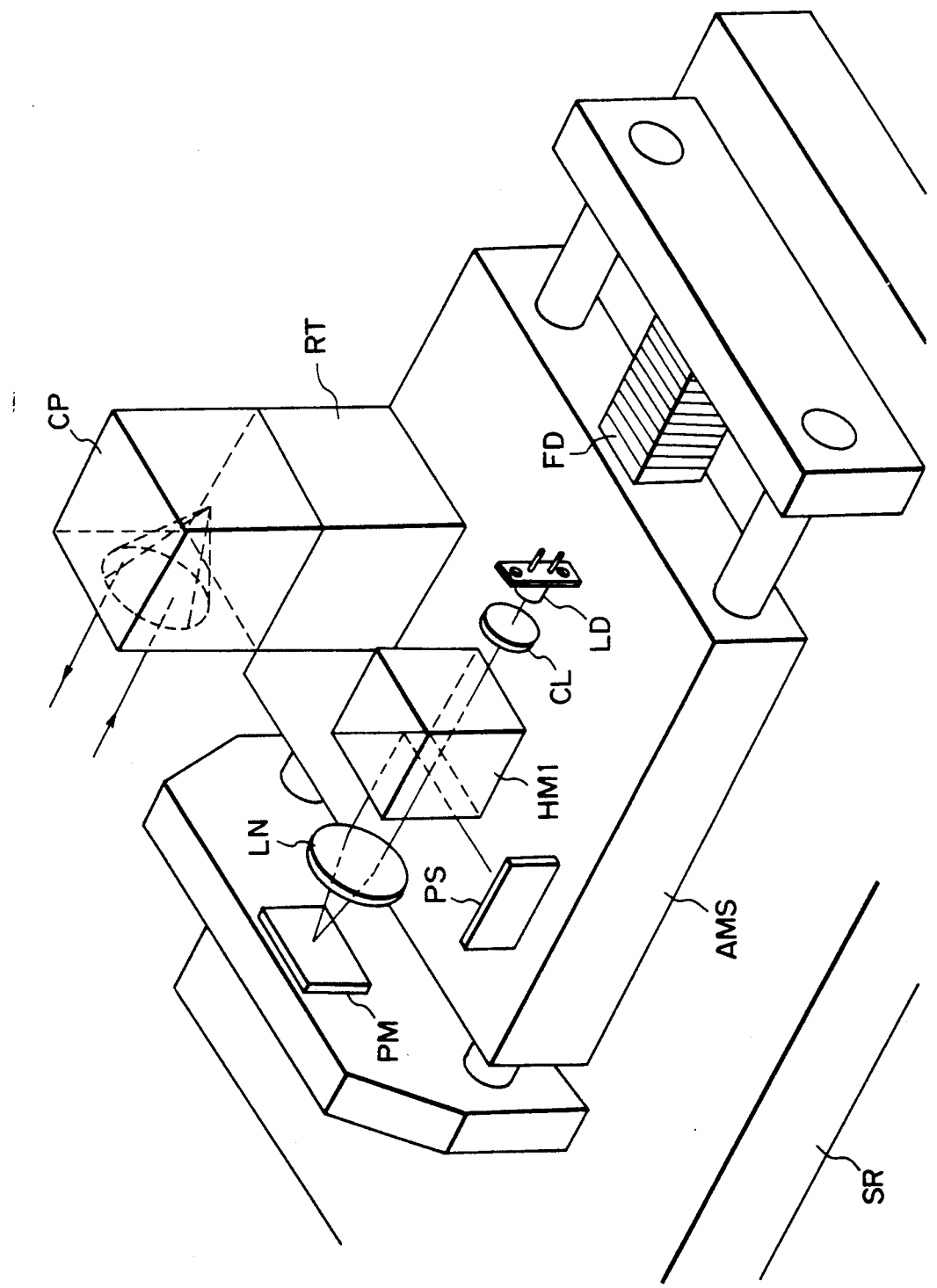
FIG. 19 is a view showing details of a distance measuring optical system provided on a fine motion stage included in the FIG. 18 embodiment.

FIG. 19 shows details of the distance measuring optical system placed on the fine motion stage AFS shown in FIG. 18. Some of the components of the FIG. 2 example constituting the diffraction grating interference type distance measuring optical system, namely the beam splitter HM2, the phase plates FP1 and FP2, the corner cube prisms CC1 and CC2, the beam splitter BS and the photodetectors PD1 and PD2, are removed and, in place thereof, the corner cube prism CP for reflecting a laser beam to the laser interference unit is mounted to a table RT which is fixed to the fine motion stage AFS.

Also, in the distance meter of this example, the distance measurement is made substantially in the same sequence (see FIG. 11) and operation as in the FIG. 1 embodiment. More specifically, a coarse motion stage SR and the fine motion stage AFS are moved and, each time the fine motion stage AFS or the subject of measurement such as an optical probe (not shown) or otherwise fixed to the stage AFS moves through a predetermined unit length $\Delta x$, a pulse signal is outputted from the laser interferometric system. Then, by use of an analog distance measurement output from the autofocusing distance measuring system, the interspace between these pulses is complemented. By doing so, it is possible to make practicable high-resolution (high-precision) distance measurement while retaining the precision of the laser interferometric distance measuring system with regard to large-stroke measurement.

Figure 20:
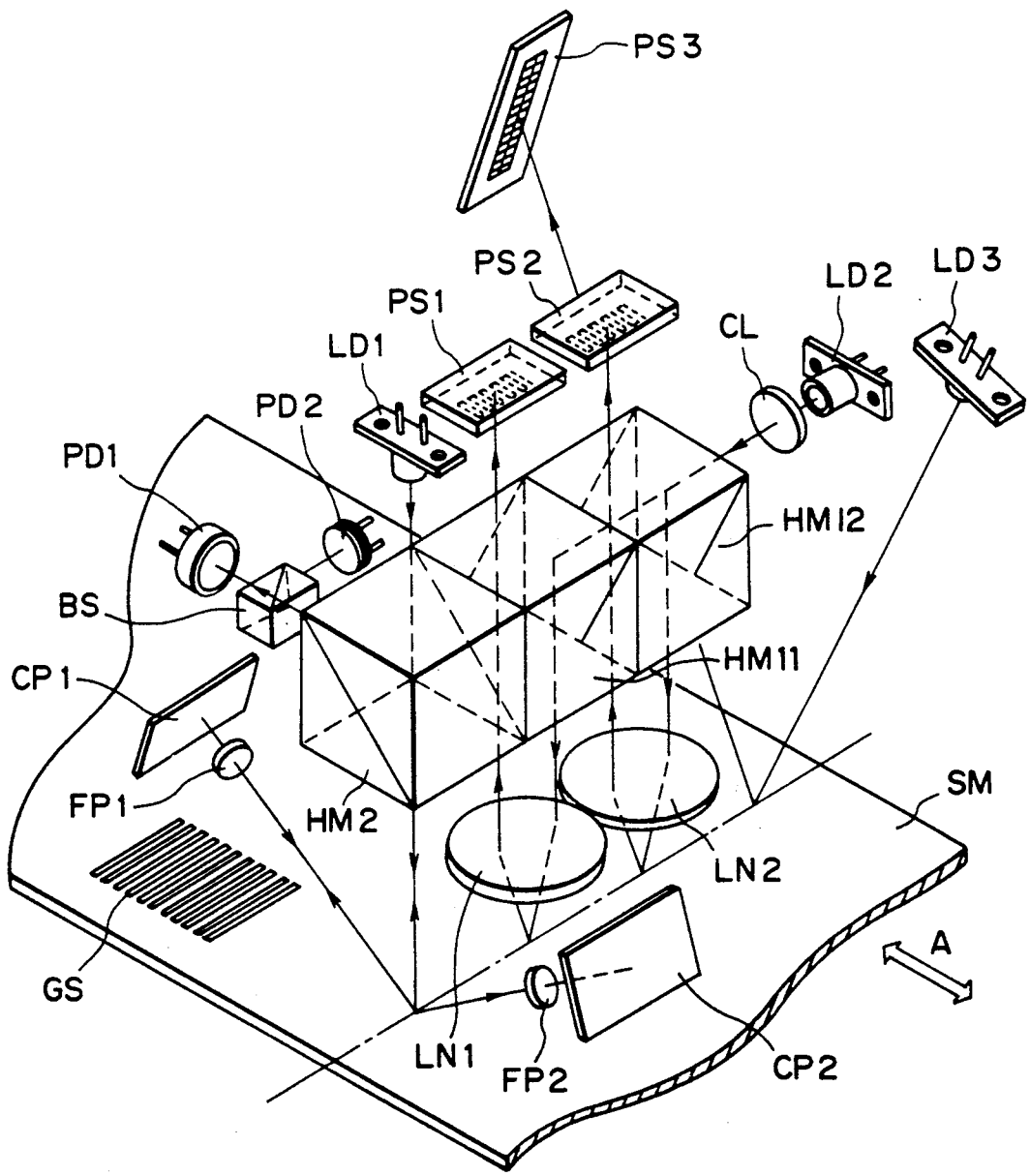
FIG. 20 is a schematic view of an embodiment wherein a blazed grating is used for the autofocusing distance measurement.
Figure 21:
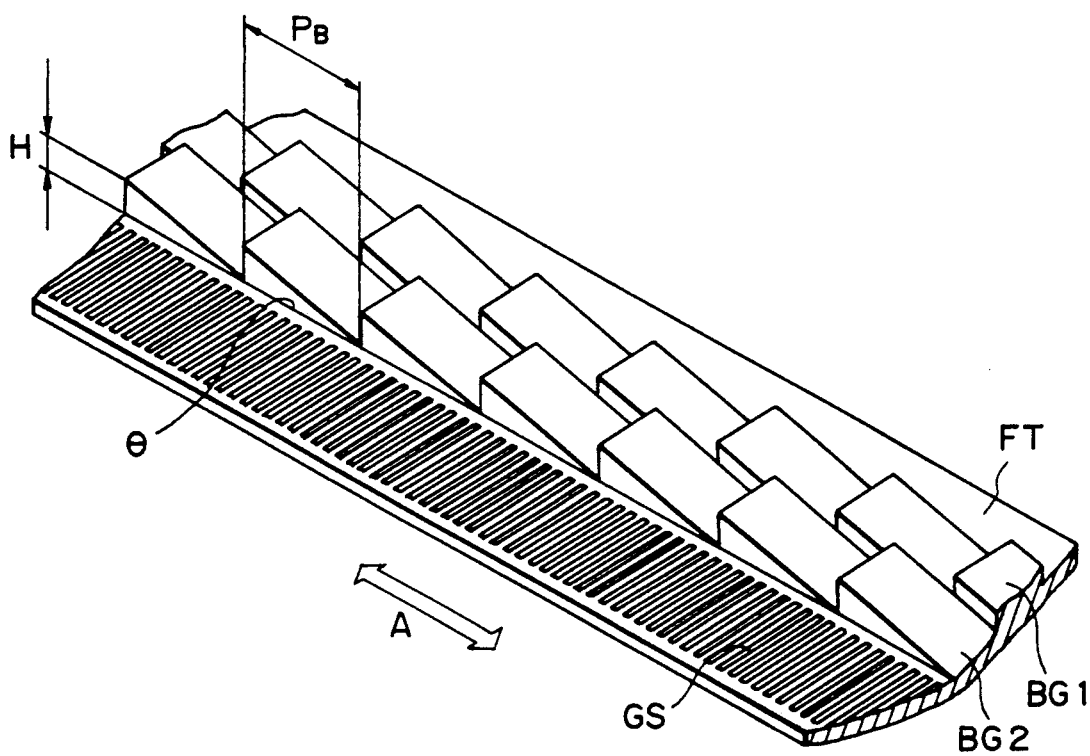
FIG. 21 is a fragmentary perspective view of a reference member on which blazed gratings are formed.

FIG. 20 shows a further embodiment of the present invention.

Figure 23:
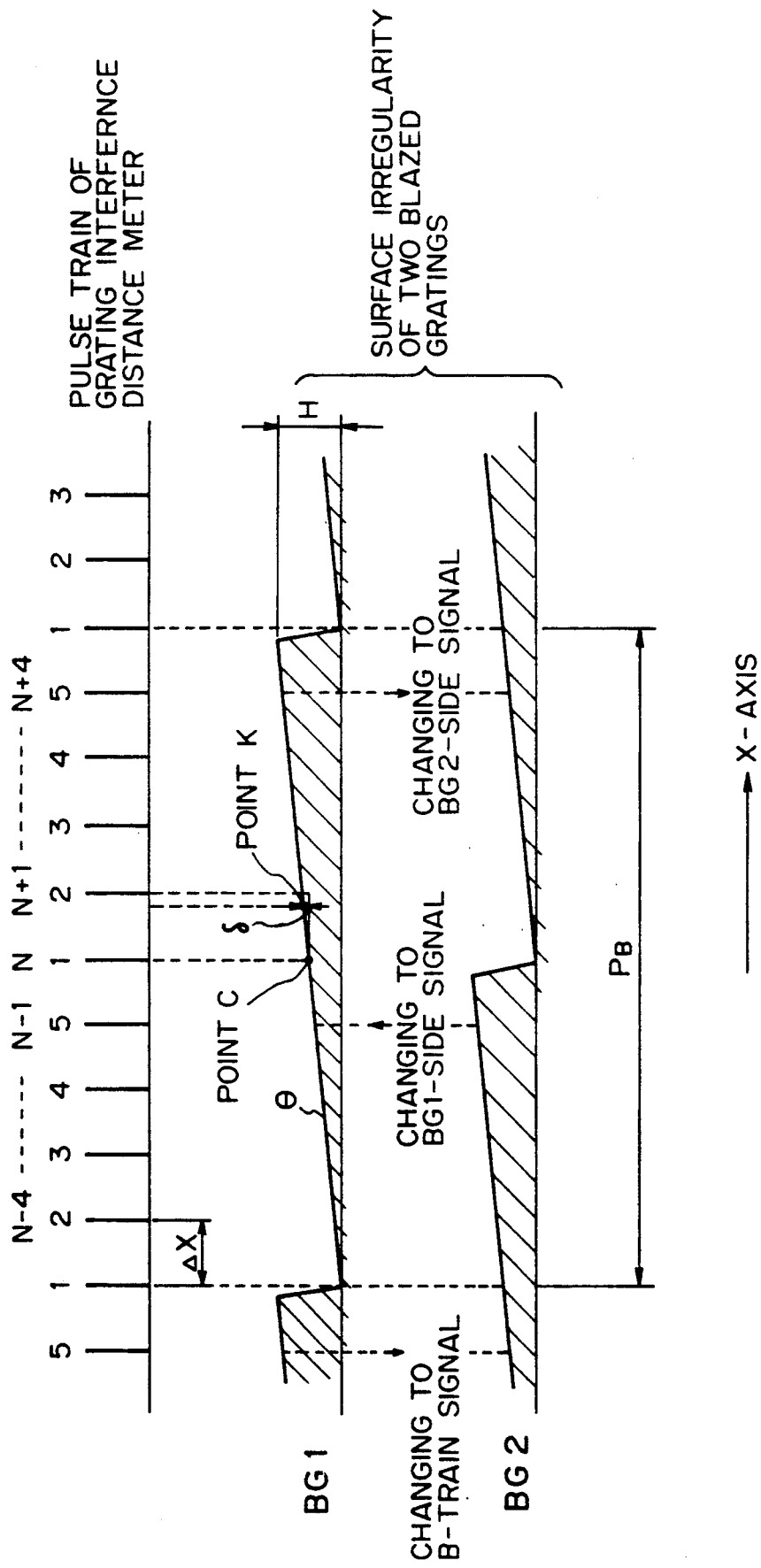
FIG. 23 is a schematic view showing the relationship between the output pulse train signal of the grating interferometric distance measuring system and the output of the autofocusing distance measuring system, in the FIG. 20 embodiment.

In this Figure, denoted at SM is a reference member having a diffraction grating which corresponds to the diffraction grating GS of the FIG. 2 example. The reference member SM is fixed to one of two objects which are movable relative to each other. The optical components, other than the reference member SM, shown in FIG. 20 constitute a distance measuring head optical system MH and they are fixedly provided on the other of the two objects. On the reference member SM, as shown in FIG. 23, a diffraction grating GS is provided for the interferometric distance measurement. Additionally, there are provided blazed gratings BG1 and BG2 for autofocusing distance measurement, disposed in parallel to the grating GS, and a flat surface FT which acts as a reflecting surface and functions as an autofocusing distance measuring reference surface. The two blazed gratings BG1 and BG2 are disposed so that they are relatively shifted in the direction of the relative movement (the direction of an arrow A) between the reference member SM and the distance measuring head optical system MH, by an amount corresponding to the half of the grating pitch $p_B$.

In FIG. 20, there are provided a light source LD1, a half mirror HM2, phase plates FP1 and FP2, mirrors CP1 and CP2, a beam splitter BS and photodetectors PD1 and PD2, all of which are cooperable to provide an interferometric distance measuring optical system. The interferometric distance measuring optical system and the grating interferometric distance measuring grating GS formed on the reference member SM correspond to the pulse train producing optical system and the sensor which have been described with reference to FIG. 2, for example.

Figure 22:
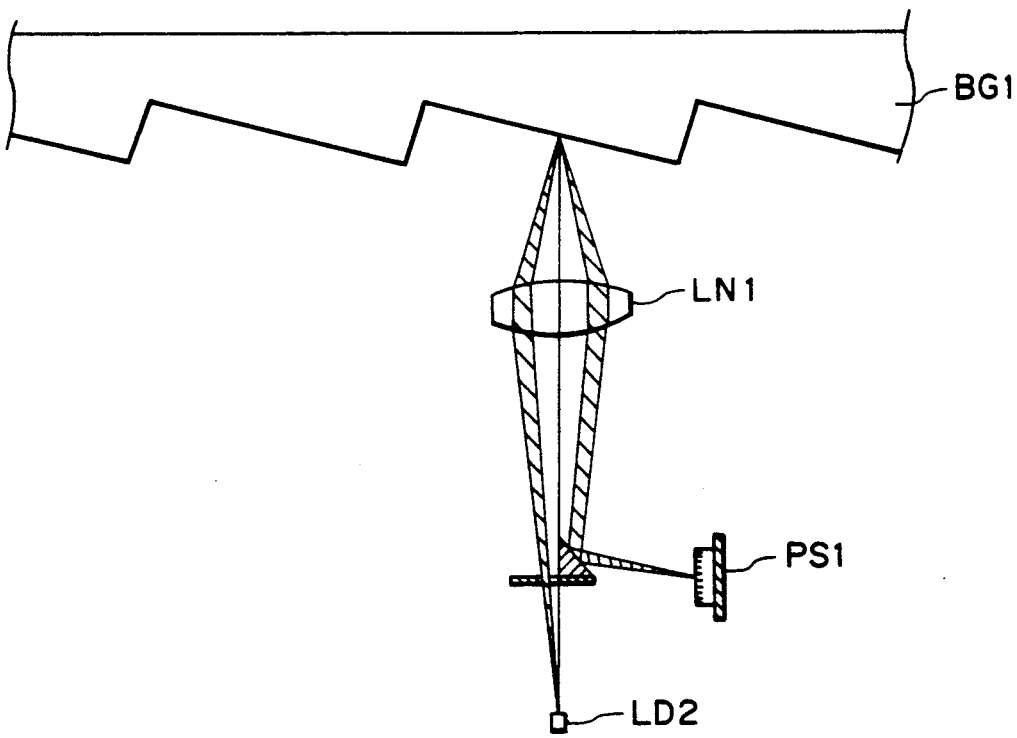
FIG. 22 is a schematic view explicating the positional relation between the blazed grating and the autofocusing distance measuring system in the FIG. 20 embodiment.

Further, there are provided a light source LD2, a collimator lens CL, half mirrors HM11 and HM12 each having a half mirror surface formed only at the half of its diagonal surface, objective lenses LN1 and LN2 and optical position detectors PS1 and PS2, all of which are effective to provide two sets of autofocusing distance measuring optical systems. Each of the autofocusing distance measuring optical systems has a structure which is optically equivalent to that of the optical system described with reference to FIG. 2, for example. Each autofocusing distance measuring optical system is disposed so that, as shown in FIG. 22, the light is focused in the neighborhood of the surface of corresponding one of the blazed gratings BG1 and BG2 formed on the reference member SM.

Further, there are provided a light source LD3 which comprises a semiconductor laser or otherwise and a light spot position detecting sensor PS3, which are used to detect any change in the gap between the reference member SM and the detecting surface of the distance measuring head optical system MH. The light source LD3 and the sensor PS3 are arranged so that a light is projected from the light source LD3 upon a reflection surface region FT on the reference member SM while the light reflected from the region FS is received by the position detecting sensor PS3 and, on the basis of this, a signal representing any change in the gap between the reference member SM and the distance measuring head optical system MH is obtained. This signal is used so that, when an error is caused in the autofocusing distance measuring signal due to the change in the gap, such an error in the autofocusing distance measuring signal is detected from that signal, such that the error can be corrected by subtracting the error component from the autofocusing signal.

FIG. 23 shows the relationship between pulse train signals as outputted from the grating interferometric distance measuring system of FIG. 20 and the sectional shape of each of the blazed gratings BG1 and BG2 formed on the reference member SM (namely, outputs of the autofocusing distance measuring system). It is now assumed that each of the blazed gratings BG1 and BG2 has a pitch $p_B$ and the difference in height (surface step) of the grating is denoted by H. The pitch $p_B$ is made even-number times larger (e.g. ten times larger) than the pulse interval $\Delta x$ of the pulse train of the grating interferometric distance measuring system.

Upon distance measurement in this device, accumulated numbers . . . n−1, n, n+1, . . . for the pulse train of the grating interferometric distance measuring system are counted. The autofocusing distance measuring systems for measuring the surface positions of the blazed gratings BG1 and BG2 are used alternately. For example, immediately before a surface step (ridge) of the grating BG1, the signal to be used for the distance measurement is switched to the signal produced from the autofocusing distance measuring system on the grating BG2 side and, additionally, immediately before a surface step (ridge) of the grating BG2, the signal to be used for the measurement is switched to the signal produced from the auto-focusing distance measuring system on the grating BG1 side. Namely, in an occasion where the relative movement of the reference member to the distance measuring head MH is such a movement of the reference member SM which is in the negative X-axis direction in FIG. 23, the switching from the BG2 side to the BG1 side is made at the timing of the $(n-1)$-th pulse while the switching from the BG1 side to the BG2 side is made at the timing of the $(n+4)$-th pulse, as shown in FIG. 23. Where the relative movement of the reference member SM is in the positive X-axis direction, the switching is made reversely. The direction of relative movement of the reference member SM to the distance measuring head optical system MH can be discriminated on the basis of autofocusing distance measurement signals corresponding to the gratings BG1 and BG2, respectively. Accordingly, the switching can be made correctly on the basis of the information obtained by the discrimination.

The output signal (autofocusing signal) of an autofocusing distance measuring system which is focused in the neighborhood of the surface of a blazed grating will change with the change in the amount of defocus of the autofocusing distance measuring optical system which change is caused as the reference member SM relatively moves. Accordingly, the movement of the reference member SM in the X-axis direction can be detected in terms of the information concerning the direction of height (surface height) of the surface of the blazed grating. In this case, in order to utilize such a region in which the autofocusing distance measurement signal shows linear characteristics with respect to the defocus amount (see FIG. 10), it is necessary that the height H of the blazed grating is made small as compared with the height by which the linearity of the autofocusing signal is ensured. For example, by selecting the height so that, at the center (point C) of the blazed grating with respect to the lengthwise direction thereof, the differential output signal $\Delta I$ (see FIGS. 9 and 10) on the sensor surface of the autofocusing system becomes null (namely, the in-focus state), a signal related to the surface height difference $\delta$ is obtainable at the position of a point K in FIG. 23. The length in the X-axis direction from the point C to the point K is determined by "$\delta \cdot H/p_B$". Therefore, if the N-th pulse corresponds to the point C, the position of the point K can be given by:

$$N \cdot \Delta x + \delta \cdot H/p_B$$

Figure 24:
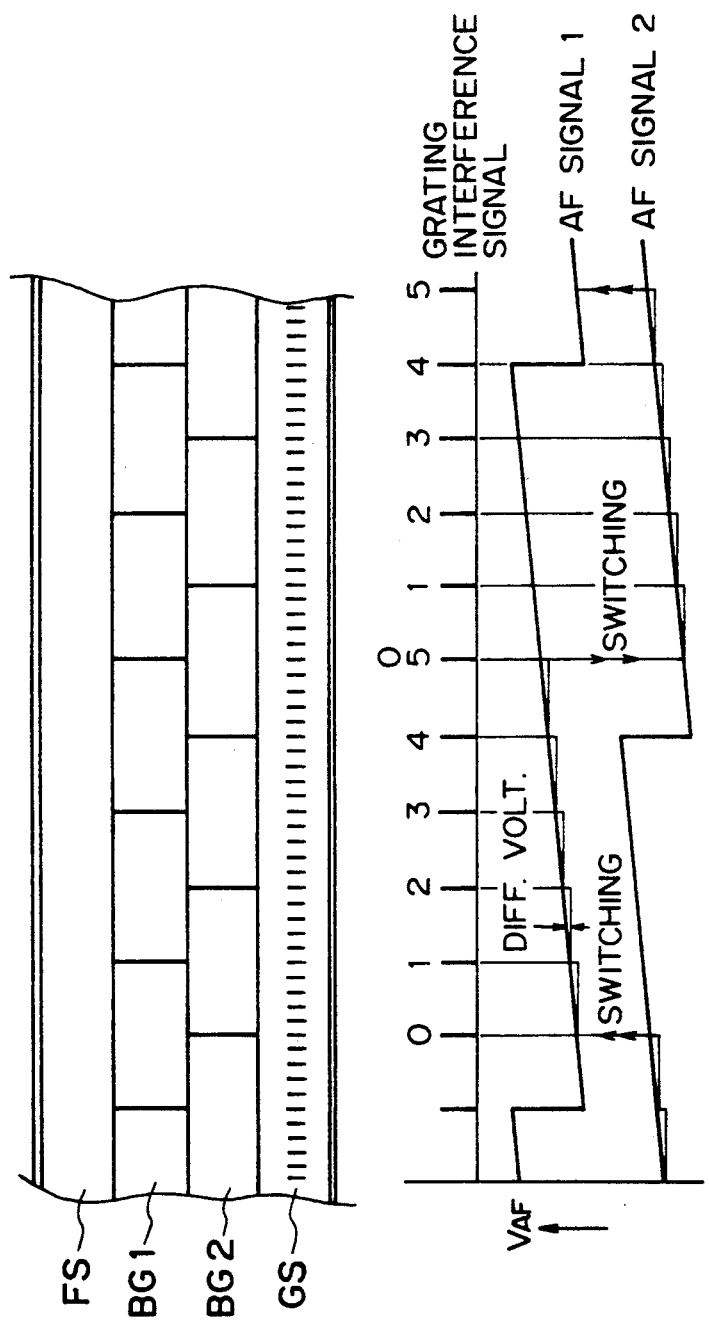
FIG. 24 is a schematic view explicating the relationship between the position of a reference member and the state of signal switching for the autofocusing distance measurement signal, in a modified form of the FIG. 18 embodiment.

Further, as shown in FIG. 24, each time a pulse signal is produced from the interferometric distance measuring system, the focus detecting voltage $V_{AF}$ at that time may be stored and, until the next pulse signal is produced, the complementating may be made on the basis of the difference voltage with reference to the stored voltage $V_{AF}$.

Where a light for the autofocusing distance measurement is projected upon the blazed grating, it is desirable that a plane defined by an incident light and a reflected light has an angle, close to a right angle, with respect to the direction of relative movement of the reference member SM.

A blazed grating usable in the present embodiment can be manufactured in accordance with any one of known methods such as a wet etching method using the relation between the crystal orientation of a silicon wafer and the etching speed, a mechanical machining method, a manufacturing method by use of lithography and dry etching, and so on.

Specifications of a particular example are as follows:

The pitch p of the interferometric distance measuring grating was 1.6 micron and the pulse interval of the pulse train of the grating interferometric distance measuring system was 0.4 micron. Objective lenses "x100" (NA $\approx$ 0.9) were used for the lenses LN1 and LN2 of the autofocusing distance measuring system. Each blazed grating used had a pitch $p_b \approx 3$ micron, a surface height difference H $\approx 1$ micron, and an angle of inclination $\theta = 18$ degrees with respect to the flat surface FS. It was found that the range of region within which the autofocusing signal showed linear characteristics was slightly less than 1 micron, and the maximum differential output $(I_A - I_B)_{max}$ was about 2 V while the noise (N) was 5 mV. The autofocusing precision obtainable as the differential output value $\Delta I(S)$ where S/N = 1, was 0.0025 micron. Also, the precision of measurement of the relative movement between the reference grating SM and the distance measuring head optical system MH was 0.007 micron.

It should be noted that, in the present embodiment, the large-stroke distance meter is not limited to a grating interferometric gauge. Any other type of distance meter such as a laser interferometric distance meter by which measuring pulse signals are obtainable may be used.

Each autofocusing distance measuring system used in the FIG. 20 embodiment is of the TTL (through the lens) focusing type. However, any other type of autofocusing system such as, for example, an autofocusing system usable as an optical pickup for use with a digital audio disk or a video disk, an autofocusing system usable in a photographic camera, may be used.

Also, either the reference member SM or the distance measuring head optical system MH may be made movable. Of course, both of them may be made movable.

Figure 25:
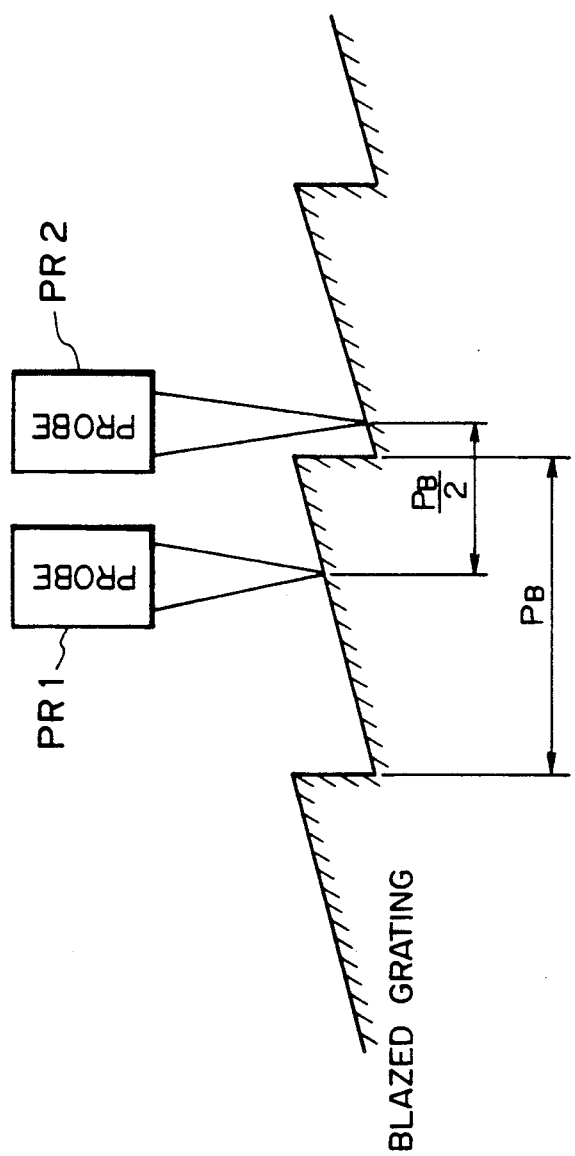
FIG. 25 is a schematic view explicating the positional relation between a blazed grating and an autofocusing distance measuring system, in a modified form of the FIG. 18 embodiment.

While, in the present embodiment, two blazed gratings are used, it is possible to use a single blazed grating in combination with two autofocusing probe systems PR1 and PR2, as shown in FIG. 25. In such case, it is preferable that the two probes are set so that two measuring points defined by the probes are spaced by a distance approximately equal to a half of the pitch of the blazed grating or an odd-number multiple of the half pitch.

In the distance measuring device of the FIG. 20 embodiment, the interspace between pulses from the distance measuring device which is adapted to produce pulse signals at intervals corresponding to a certain length or distance, as in the case of a grating interferometric distance measuring device or a laser interferometric distance measuring device, is complemented on the basis of the measured value obtained by a high-precision (high-resolution) and small-stroke autofocusing distance measuring means which is focused on the surface configuration of a blazed grating member. Therefore, the interspace between pulses can be resolved additionally so that it is made practicable to assure high-precision and high-resolution measurement while retaining high precision of the pulse producing position of the distance measuring device.

Further, the autofocusing measuring means has a very small stroke such as of an order of 1 micron, for example, and, for this reason, in the FIG. 1 embodiment the distance-measuring-head carrying stage means is made by a dual structure comprising a movable stage SR and a fine motion stage AFS. However, in the present embodiment, a particular member like a blazed grating wherein inclined surfaces are repeatedly formed with minute surface height differences is used and, by use of such a member, a displacement corresponding to the small stroke in the moving direction of the object being examined is converted into a displacement in the direction intersecting the moving direction and, after such conversion, it is measured. Therefore, by setting the surface height difference of the member like the blazed grating so that the difference is within the stroke of the autofocusing distance measuring means, it is possible to measure a minute displacement, within the small stroke of the autofocusing distance measuring means, which may be a portion of the movement through a large distance, without the necessity of moving the autofocusing means.

Further, as described hereinbefore, two blazed grating members are disposed so that their surface step positions are relatively shifted in the moving direction. Alternatively, a single blazed grating member is used with the points being deviated by an amount corresponding to about a half of the pitch of the grating taken as the targets for the autofocusing distance measurement. In any case, before and after a surface step (ridge) of the blazed grating member, the subject of measurement or the position is switched so as to preclude that an autofocusing distance measuring signal from such portion of the blazed grating member as having an unreliable surface shape is used. With this arrangement, further improvement in the measuring precision is attainable.

Figure 26:
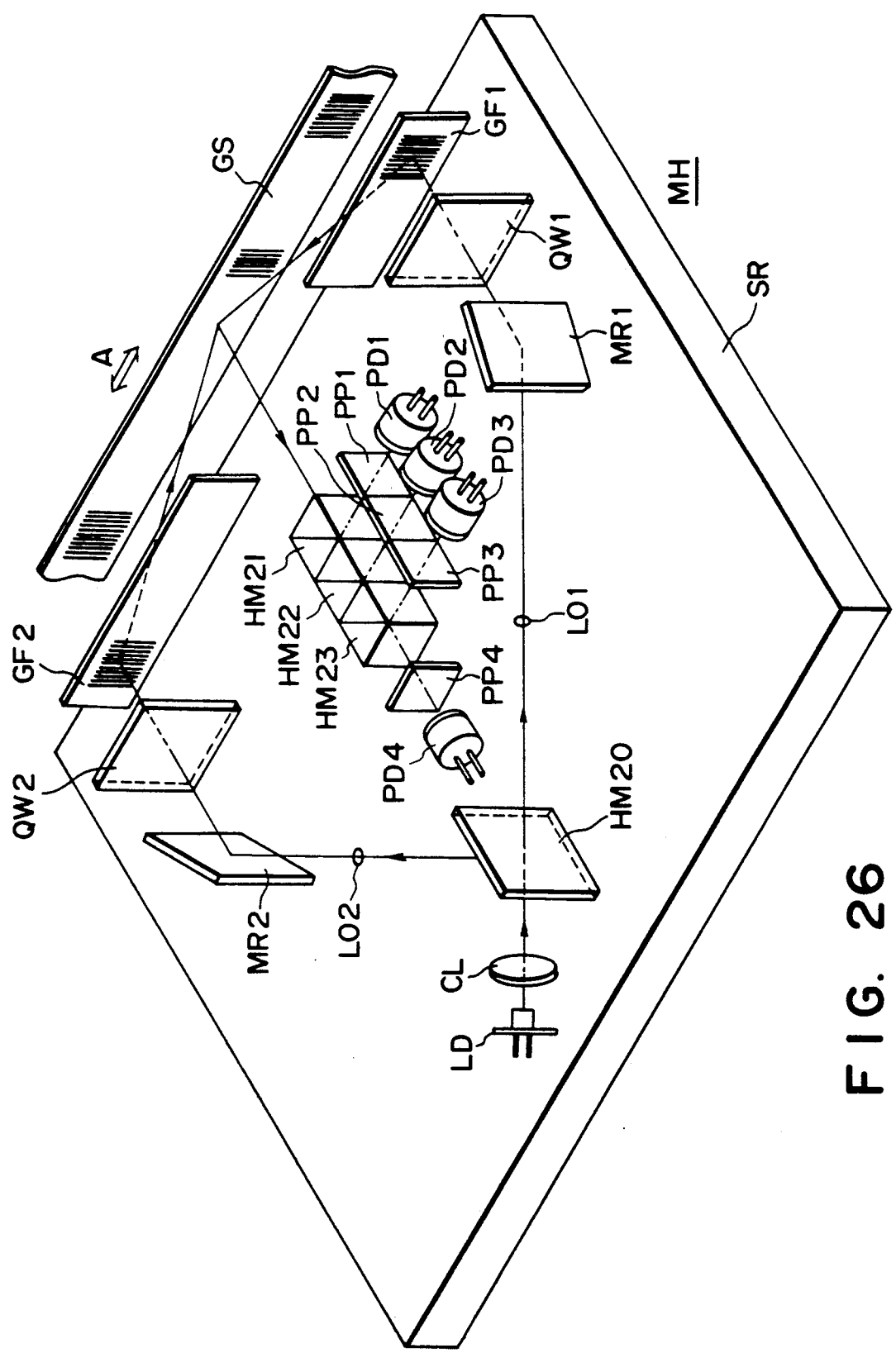
FIG. 26 is a schematic view showing the structure of a diffraction grating interferometric distance measuring device according to another embodiment of the present invention, wherein no corner cube is used.

FIG. 26 shows an example of a diffraction grating interferometric distance measuring device which is constructed without use of any corner cube member as the pulse signal producing means. In FIG. 26, a relatively movable diffraction grating GS is fixedly provided on one of two objects which are movable relative to each other, and a distance measuring head portion MH is fixedly provided on the other of the two objects.

A laser beam emitted from a light source LD (for example, a semiconductor laser) of the distance measuring head portion MH is transformed into a plane wave by means of a collimator lens CL and then is divided into two by means of a half mirror MH20. The split two light beams L01 and L02 are reflected by mirrors MR1 and MR2, respectively, and are incident upon quarter waveplates QW1 and QW2. Thereafter, they are diffracted by stationary gratings GF1 and GF2, respectively. Positive and negative N-th order diffraction lights LN1 and LN2 are projected upon the relatively moving grating GS whereat they are reflectively diffracted again, such that they go back in the same direction and are combined with each other. The thus obtained light is separated by half mirrors HM21-HM23 and, after being converted into electric signals by means of the combination of polarization plates PP1-PP4 and sensors (photodetectors) PD1-PD4, they are extracted. The quarter waveplates QW1 and QW2 disposed on the paths of the light beams L01 and L02 are preparatorily set so that their fast axes are inclined by respective angles +45 degrees and −45 degrees with respect to a linearly polarized light component of the laser beam. Further, the angular positions of the polarizing plates PP1-PP4 are so set that their orientations of polarization become equal to 0 degree. 45 degrees, 90 degrees and 135 degrees, respectively.

Figure 27:
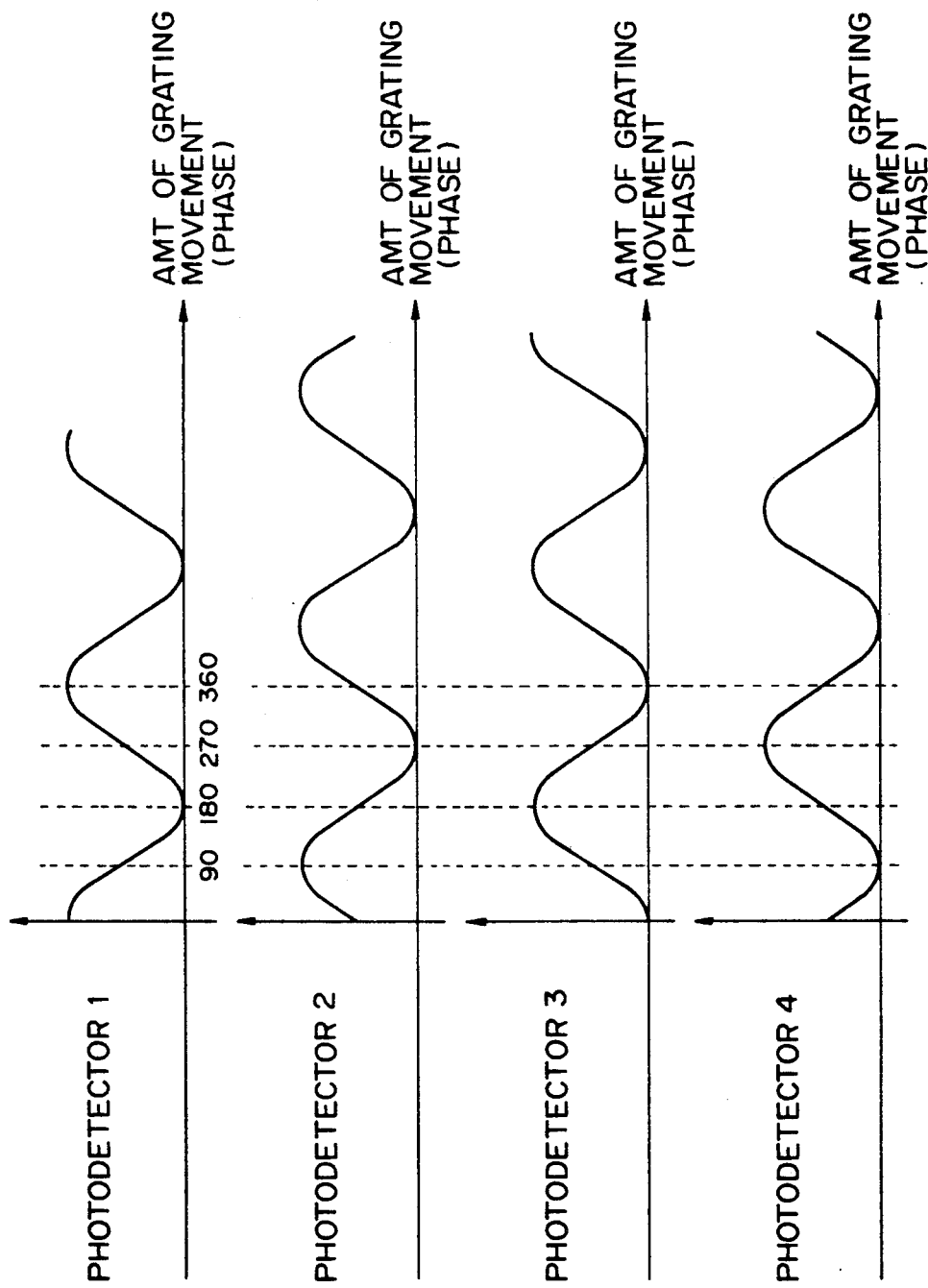
FIG. 27 is a waveform view showing outputs of photodetectors used in the FIG. 26 embodiment.

With this arrangement, the quantity of each light impinging upon a corresponding one of the sensors PD1-PD4 changes, as shown in FIG. 27, with the movement of the relatively movable grating GS, and these changes are detected as light quantity detecting outputs. Namely, from the sensors PD1-PD4, output signals whose phases are shifted successively by a phase difference of 90 degrees.

Figure 28:
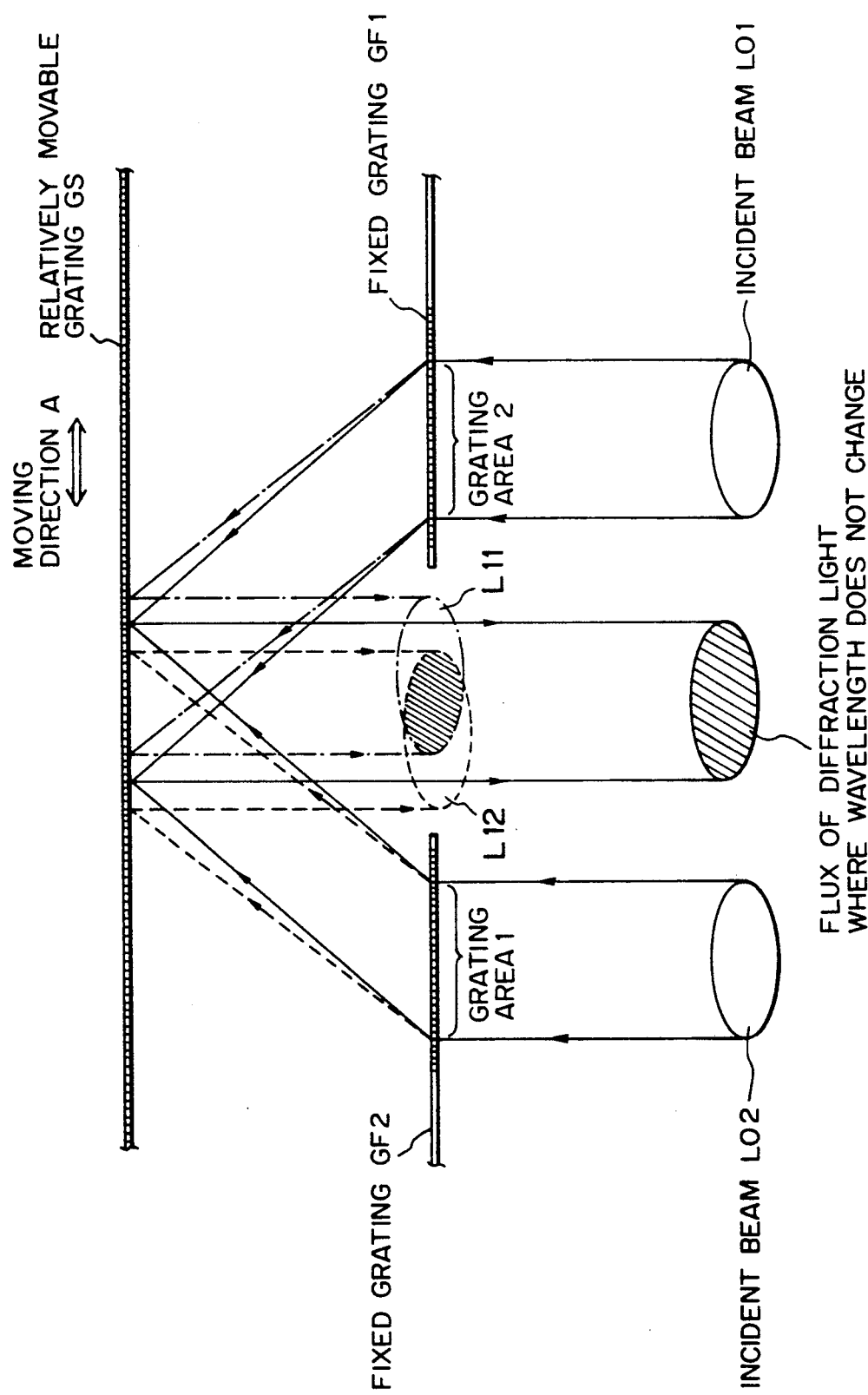
FIG. 28 is a schematic view explicating the state of diffraction light where the output wavelength of a light source changes, in the case of the distance measuring device of the FIG. 26 embodiment.

FIG. 28 shows the state of diffraction lights where, in the distance measuring system of the FIG. 26 example, the output wavelength of the light source LD shifts.

Figure 29:
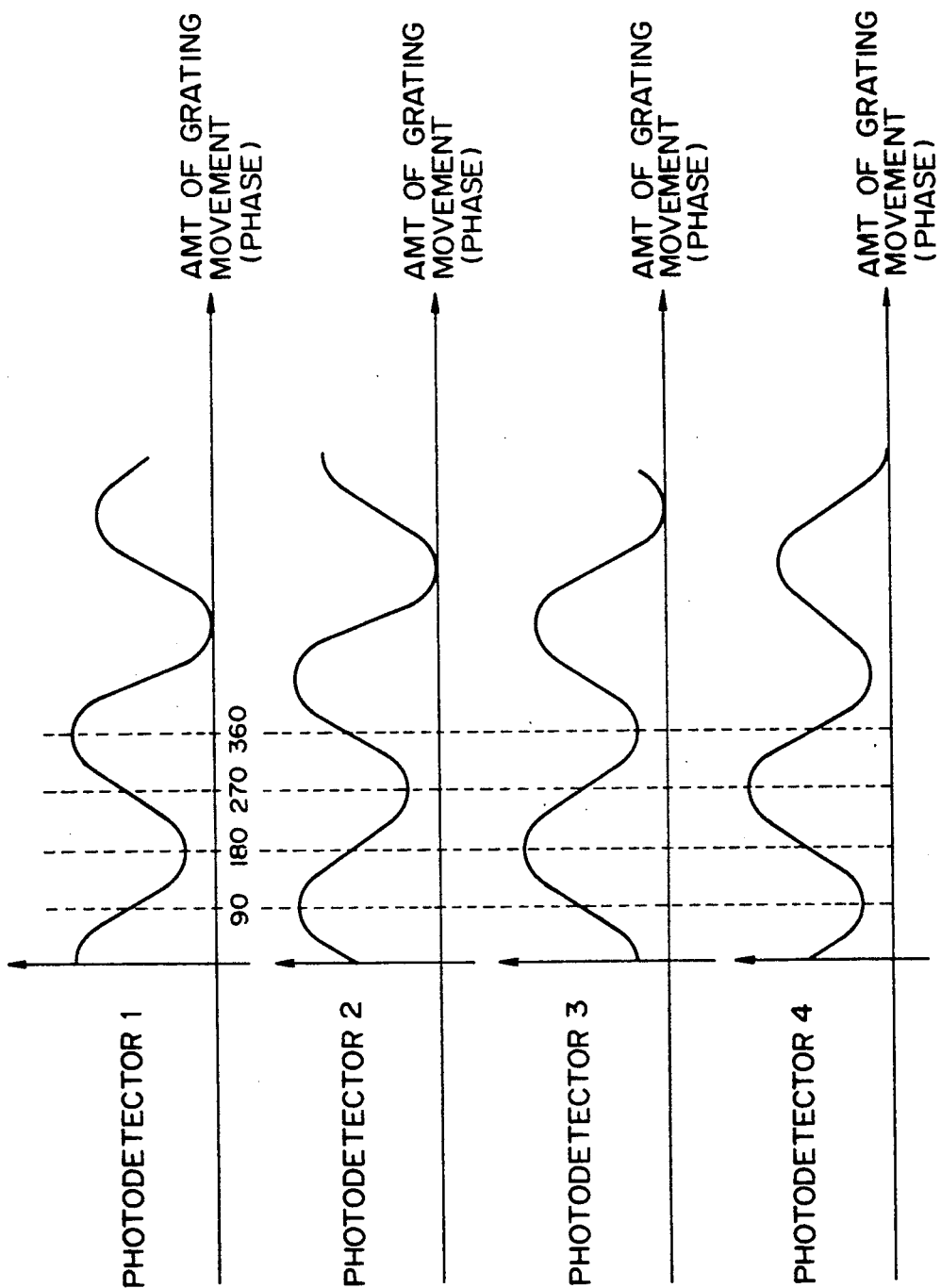
FIG. 29 is a waveform view showing outputs of photodetectors of the FIG. 26 embodiment where the wavelength of light from the light source is shifted.

In FIG. 28, the paths of lights where the adjustment is substantially perfect are depicted by solid lines, whereas the paths of lights where the wavelength is shifted are depicted by dash-and-dot lines. Thus, the light fluxes as denoted at L11 and L12 in this Figure depict, respectively, the diffraction lights caused when the wavelength has been shifted. The outputs of the sensors PD1-PD4 when there occurs such a wavelength shift are such as depicted in FIG. 29. Independently of the amount of movement of the relatively movable grating GS, a so-called bias component is included in each of the outputs of the sensors. The reason for this is that a light flux area (in which no interference fringe is formed) other than the interference area as depicted by hatching in FIG. 28 increases and that the extent of the light flux area in which no interference fringe is formed changes with the amount of shift in the wavelength. Accordingly, there occur those changes as being depicted in the signal waveforms of the outputs of the photodetectors PD1-PD4 shown in FIG. 29. However, in an occasion where the processing is going to be made on the basis of four detection signals having successive phase differences of 90 degrees, the division with respect to the period of signals can be made with a good precision even if the wavelength shifts.

More specifically, the four signals are classified into two sets each comprising two signals having a phase difference of 180 degrees. When two difference signals each concerning the two signals of a corresponding set are considered, these two difference signals have a phase difference of 90 degrees. Thus, by using such two difference signals, pulse signals are obtainable in a similar manner as has been described with reference to the foregoing embodiments. These two difference signals are not affected by any change in the DC level, and each having an amplitude twice larger than that of the original signal. Accordingly, measurement can be made with a good precision.

If only two sensors are used and if it is desired to obtain pulses of the same pitch as in the case of using four sensors, by electrically processing two kinds of signals having phases of 0 degree and 90 degrees, then the precision of electric division of the signals will be deteriorated as a result of any shift of the wavelength. This is the same as that described with reference to FIGS. 3–6.

Where light is projected upon a grating with an arrangement such as disclosed in Japanese Laid-Open Patent Applications, Laid-Open Nos. Sho58-191906 and Sho58-191907, the direction of diffraction thereof (namely the angle) changes with the change in the wavelength of the light. To meet such characteristics, corner cubes are used. The corner cube is a prism formed to define an angle of 90 degrees between multiple surfaces so that the reflected light goes back in the same direction as of the incident light. The corner cube requires high machining accuracy so that it is expensive. Further, the size is large.

In the device of FIG. 26, diffraction grating means (stationary gratings GF1 and GF2) are provided also on the distance measuring head portion MH side, in addition to the movable grating GS, so that the positive and negative N-th order diffraction lights from the stationary gratings are diffracted again by the movable grating, the last diffracted lights advancing along the same path to the sensor. Accordingly, without use of any corner cube described above, interference light whose brightness changes with the movement of the movable grating is obtainable when the wavelength changes. In other words, the described grating interferometric distance meter has good stability to the change in the wavelength without use of any corner cube. Therefore, the cost and size of the device can be reduced. Further, the described structure facilitates integration of the components into a compact device, as will be described later.

Where a grating interferometric distance measuring device is formed by a light source, a half mirror, corner cubes, polarizing plates, detectors and so on which are three-dimensionally combined, there is a possibility of deterioration of the distance measuring accuracy due to inclusion of an error into an interference signal, as a result of mechanical variation between optical components, temperature change or irregular flow of air. Also, separate provision of the light source, the detecting system and so on leads to the bulkiness in volume occupying a space. It is not difficult to make the structure compact. Moreover, because of the spatial distance from the detecting system to the processing circuit, noise is easily mixed into the signal, causing deterioration of the measuring precision.

Figure 30:
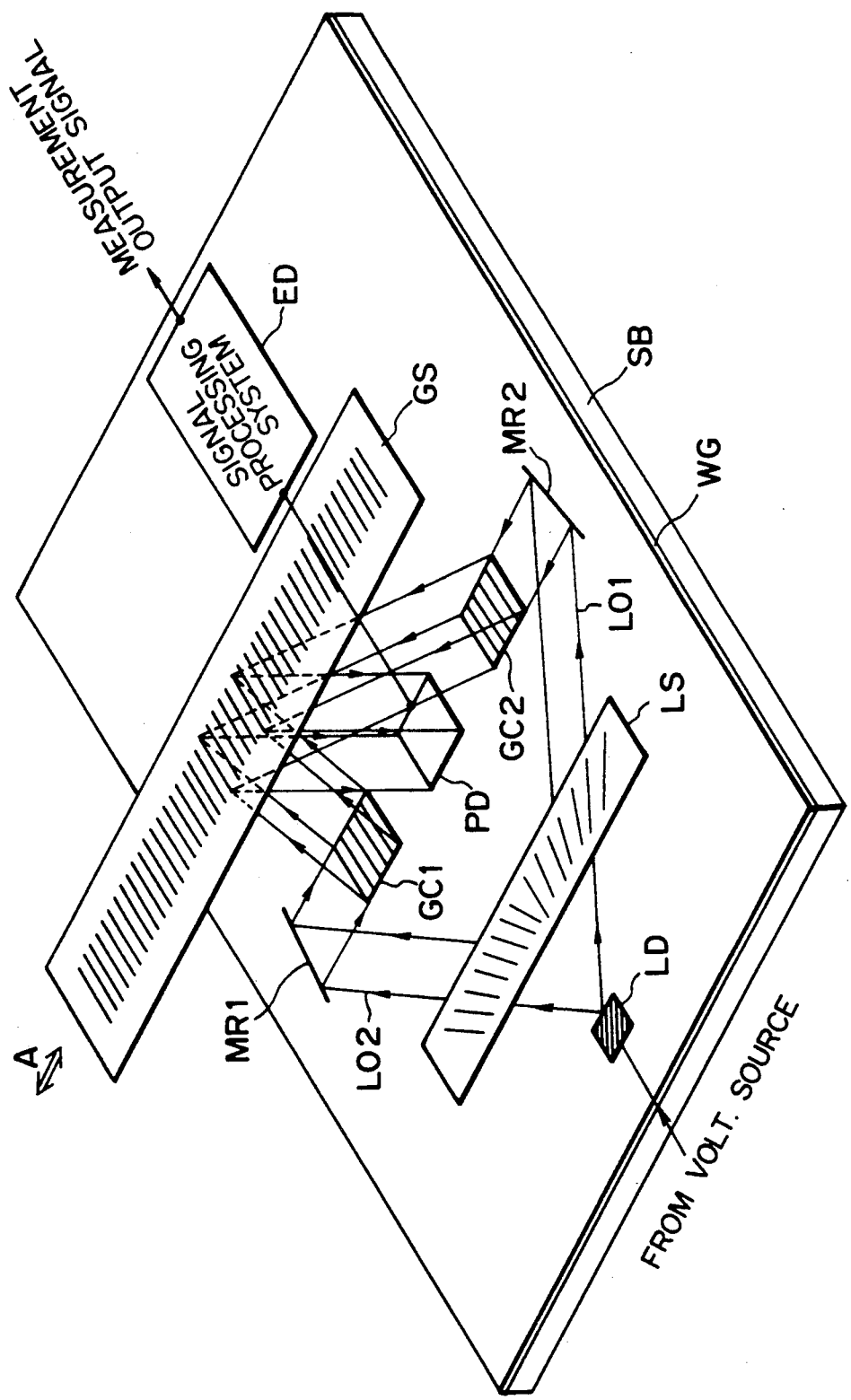
FIG. 30 is a schematic view of a grating diffraction type distance measuring device according to a further embodiment of the present invention, wherein a major portion of the device is formed into an integrated circuit device.

FIG. 30 shows an example wherein major components of a diffraction grating distance measuring device are formed into an "integrated circuit". In this example, a portion which corresponds to an optical system of the distance measuring head portion MH of the distance meter of the FIG. 26 embodiment and a signal processing electric system effective to produce pulses in accordance with the brightness/darkness of the interference light, are formed on a base plate of GaAs.

As shown in this Figure, a dielectric waveguide layer WG is formed on the GaAs base member SB, and the light wave is propagated along a preset optical path.

Light source LD can be formed on the GaAs base plate SB by use of molecular beam epitaxy method, for example. A lens and beam splitter portion LS formed in the waveguide layer WG is effective to transform a diverging light from the light source LD into a parallel light and, then, divide the same along two directions. Grating couplers GC1 and GC2 each effective to emit, at a certain angle, the light wave propagated through the thin film waveguide WG, outwardly to the outside space.

Reference diffraction grating GS corresponds to the movable grating GS of the distance meter of the FIG. 26 embodiment, and is effective to diffract the light waves from the grating couplers GC1 and GC2 toward the same direction. Photodetector PD is provided to detect the interference light intensity of the diffraction light from the reference diffraction grating GS.

Next, the operation will be described.

The light wave from the light source LD is propagated through the waveguide WG and, by means of the lens and beam splitter portion LS, it is transformed into two parallel lights L01 and L02 which are propagated through the waveguide WF in different directions. Each of the lights L01 and L02 is reflected within the waveguide WG by corresponding one of mirrors MR1 and MR2 so that it advances in parallel to the lengthwise direction of the reference grating GS. The reflected lights from the mirrors MR1 and MR2 are incident on the grating couplers GC1 and GC2. The grating couplers GC1 and GC2 each functions to emit the light wave, having been propagated through the waveguide WG, from the surface of the base plate to the outside at a preset angle and through the waveguide surface. This angle is related to the pitch of the reference grating GS and the wavelength of the light. If a reference grating having a pitch p=1.6 micron is used, and where the wavelength $\lambda=0.83$ micron, then the angle of emission is 58.8 degrees.

The two light waves from the grating couplers GC1 and GC2 are perpendicularly diffracted by the reference diffraction grating GS and are incident on the photodetector PD. The photodetector PD operates to photoelectrically convert the interference intensity of the two diffraction lights.

Next, the principle of operation as a distance meter will be explained.

The light waves emitted to the outside space by means of the grating couplers GC1 and GC2 are diffracted by the reference grating GS, as described. The intensity distribution of the diffraction light produced at that time can be expressed by the following equation:

$$I = I_0 + I_1 \cos[2\pi \cdot X/\{p/(m-n)\}]$$

wherein
- $X$: the amount of relative change between the base plate and the reference grating;
- $p$: the pitch of the reference diffraction grating;
- $m$: the order of diffraction, by the reference diffraction grating of the light from the grating coupler GC1;
- $n$: the order of diffraction, by the reference diffraction grating of the light from the grating coupler GC2;
- $I_0$: the DC level; and
- $I_1$: the signal amplitude.

Assuming now that $m=+1, n=-1$ and $p=1.6$ micron, then the intensity distribution I can be determined by:

$$I = I_0 + I_1 \cos[2\pi \cdot (X/0.8)]$$

It is seen therefrom that, each time the reference grating GS moves through 0.1 micron pitch, a sine wave signal of one cycle is produced. The detector PD is operable to count the cycles of such sine wave signals, so that the amount of movement of the reference grating GS can be measured.

The grating interference type distance measuring device of the present embodiment has a light source, optical members and a detection system processing circuit which are made integral on the same base plate. Accordingly, the size can be reduced and the noise can be suppressed and, additionally, higher precision is attainable.

Description will now be made of the means for detecting the moving direction of the reference grating GS.

In order to detect the moving direction, it is necessary to obtain two signals whose phases are relatively shifted by an amount corresponding to one-fourth (¼) of the cycle.

Figure 31:
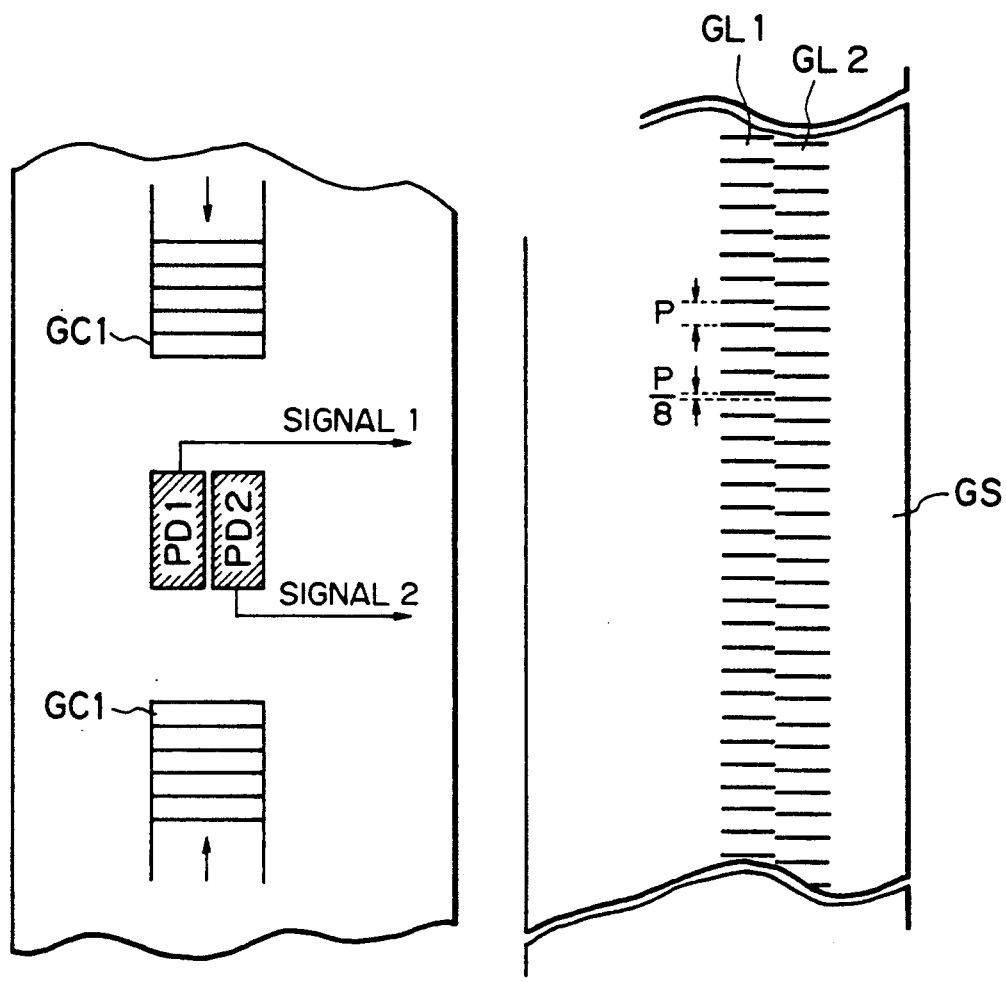
FIG. 31 is an enlarged view showing a major portion of a distance measuring device according to a modified form of the FIG. 30 embodiment.

A specific example is illustrated in FIG. 31, wherein the reference grating GS is formed by two grating arrays GL1 and GL2 whose phases are relatively shifted with respect to the moving direction of the reference grating GS by an amount corresponding to ¼ × (m−n) pitch. Additionally, two photoelectric detectors PD1 and PD2 are formed on the base plate SB, correspondingly to the two grid arrays.

Figure 32:
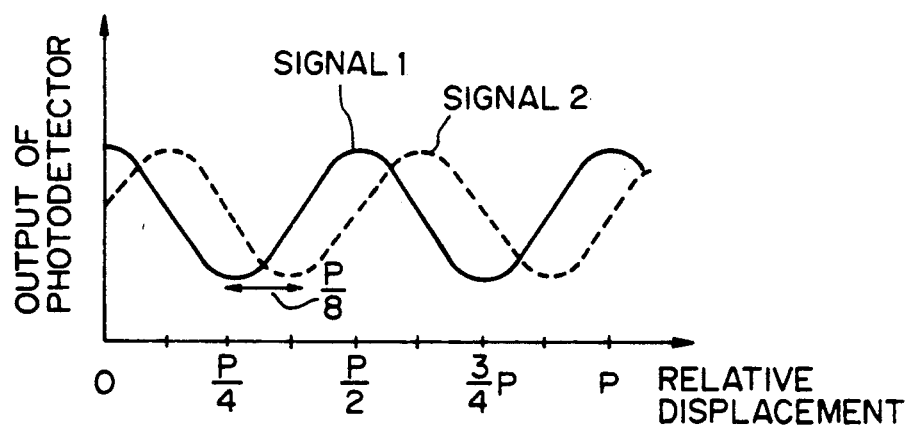
FIG. 32 is a waveform view showing outputs of photodetectors used in the FIG. 31 device.

The diffraction lights from the grid arrays GL1 and GL2, respectively, are received by the different sensors PD1 and PD2 which are spatially separated. By this, signals whose phases are relatively shifted by one-fourth (¼) of the cycle, such as shown in FIG. 32, are obtainable.

Figure 33:
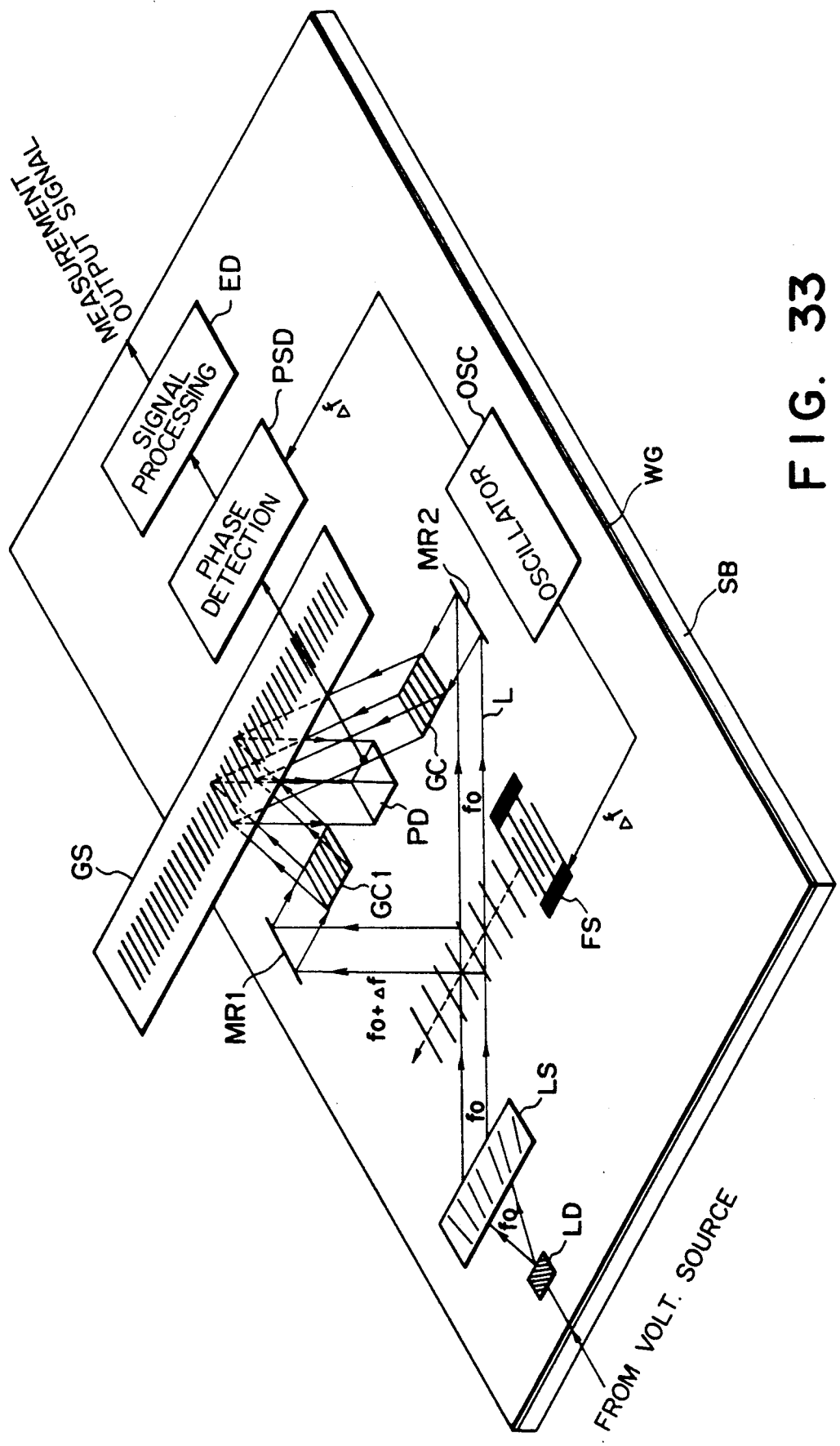
FIG. 33 is a schematic view showing a distance measuring device according to a further modified formed of the FIG. 30 embodiment.

FIG. 33 shows an example wherein a grid interference type distance measuring device is provided as an optical heterodyne measurement device.

In this example, a frequency shifter FS which comprises a surface acoustic wave device, for example, is disposed at the middle of the optical path so that a light wave whose frequency is shifted, with respect to the frequency $f_0$ of the output light from the light source LD, by an amount $\Delta f$ corresponding to the oscillation frequency of an oscillator OSC. Light waves of the frequency $f_0$ and the frequency $f_0 + \Delta f$ are projected upon grating couplers GC1 and GC2 and, by way of these couplers, they are projected upon a reference grating GS having a single grating array. The light diffracted by the reference grating GS is received by a photodetector PD.

The signal which can be directly obtained by the photodetector PD can be expressed as follows:

$$I = I_0 + I_1 \cos[2\pi \Delta f t - 2\pi \cdot X / \{p/(m-n)\}]$$

It is seen therefrom that, by detecting a phase difference with respect to an output signal from the oscillator OSC by use of a phase detecting circuit PSD, the amount of movement of the reference grating GS and the moving direction thereof can be detected as in the case of the foregoing embodiment.

One of the features of the device of the present embodiment lies in that there is no necessity of use of a special grating (see FIG. 31 for example) for the discrimination of the moving direction. Additionally, in a short time, the averaging with respect to time is attainable. Therefore, the amount of movement can be detected very precisely.

In the integrated circuit type distance measuring devices of the FIGS. 30 and 33 examples, a GaAs member is used as the base plate SB. However, the base member may be made of Si. In such case, the light source LD may be provided outwardly.

As described hereinbefore, by integrally providing an optical system (excluding a reference grating) and a signal processing electric system upon a single base member, in a grid interference type distance measuring device, the necessity of assembling adjustment is eliminated and the device can be made stable against disturbance. Further, the size and weight of the device can be reduced, while assuring high-precision measurement.

Usually, in a grid interference type distance measuring device, an optical system includes mirrors or corner cubes. Particularly, mirrors or otherwise is used in an optical system for projecting light upon a grating. However, this leads to a difficulty in the assembling adjustment and a difficulty in making the device compact.

Figure 34:
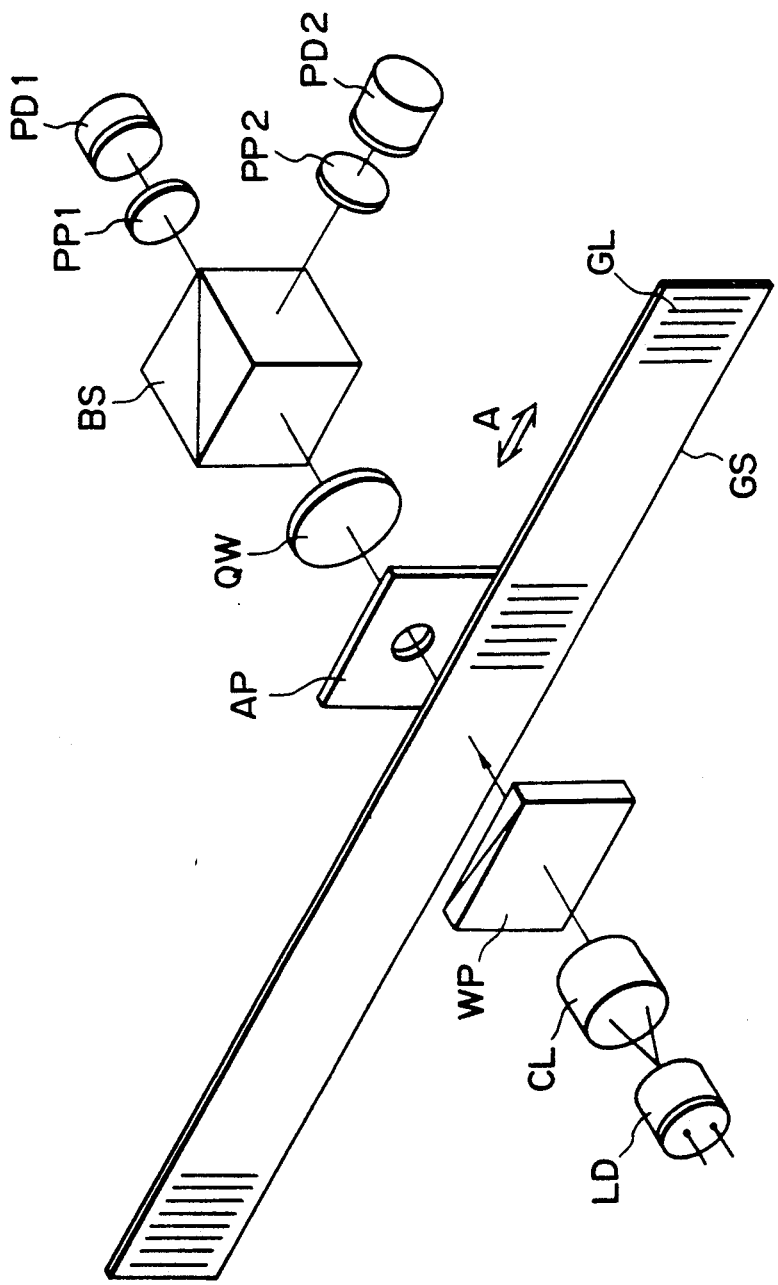
FIG. 34 is a perspective view schematically showing a grating interference type distance measuring device according to a yet another embodiment of the present invention, wherein a Wollaston prism is used.

FIG. 34 shows an example wherein a double refraction prism such as a Wollaston prism is used so as to project a light upon a relatively moving grating, such that an optical system for directing the light to the grating is made simple in structure.

Figure 35:
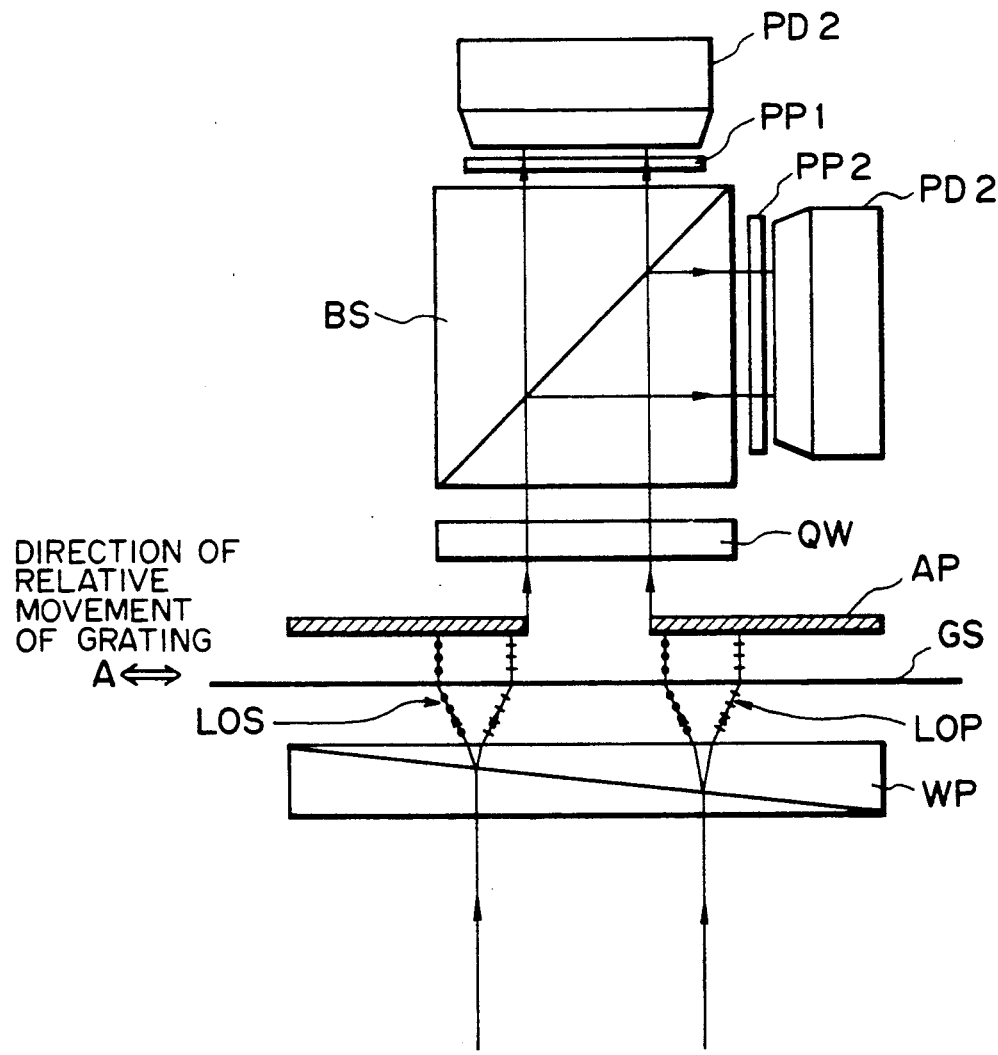
FIG. 35 is a schematic view explicating the function of the Wollaston prism of the FIG. 34 device.

In FIG. 34, a light emitted from a light source LD such as a semiconductor laser or otherwise is transformed into a plane wave by means of a collimator lens CL, and the plane wave thus formed is perpendicularly incident upon a Wollaston prism WP. The Wollaston prism is formed by cementing two double refraction (birefringence) material members (e.g. calcite members) shaped like a prism. The light incident upon the Wollaston prism is divided into two polarized light components perpendicular to each other, and both of the light components can be extracted. FIG. 35 shows this. The light to be projected upon the Wollaston prism WP may be a linearly polarized light having a direction of polarization inclined by 45 degrees with respect to a P-polarized light L0p and an S-polarized light L0s or, alternatively, a circularly polarized light which may be provided by interposing a quarter waveplate between the collimator lens CL and the Wollaston prism WP.

In FIG. 35, the lights emanating from the Wollaston prism WP are such that their P-polarized light components and S-polarized light components have the same angle of incidence with respect to the grating GS, but the angles of incidence of these polarized light components have opposite signs. When these lights pass through a quarter waveplate QW, the P-polarized light and the S-polarized light are converted into circularly polarized light having opposite rotational directions. These circularly polarized lights can spatially interfere with each other. The interfering light is divided by a beam splitter BS into two which are directed to two photodetectors PD1 and PD2, respectively, having polarizing plates PP1 and PP2 disposed in front of them, respectively. By doing so, signal outputs such as illustrated in FIG. 3 are obtained and, by effecting the electric processing having been described with reference to the device of FIG. 1, signals of the grating interference type distance meter are obtained. The polarizing plates PP1 and PP2 have their polarization axes shifted by 45 degrees relative to each other.

In the device of FIG. 34, a Rochon prism, a Glan-Thompson prism or otherwise may be used as the double refraction prism. However, where these prisms are used, the relation between the prism used and the light incident upon differs from the relation (perpendicular incidence) as established when a Wollaston prism is used.

Figure 36:
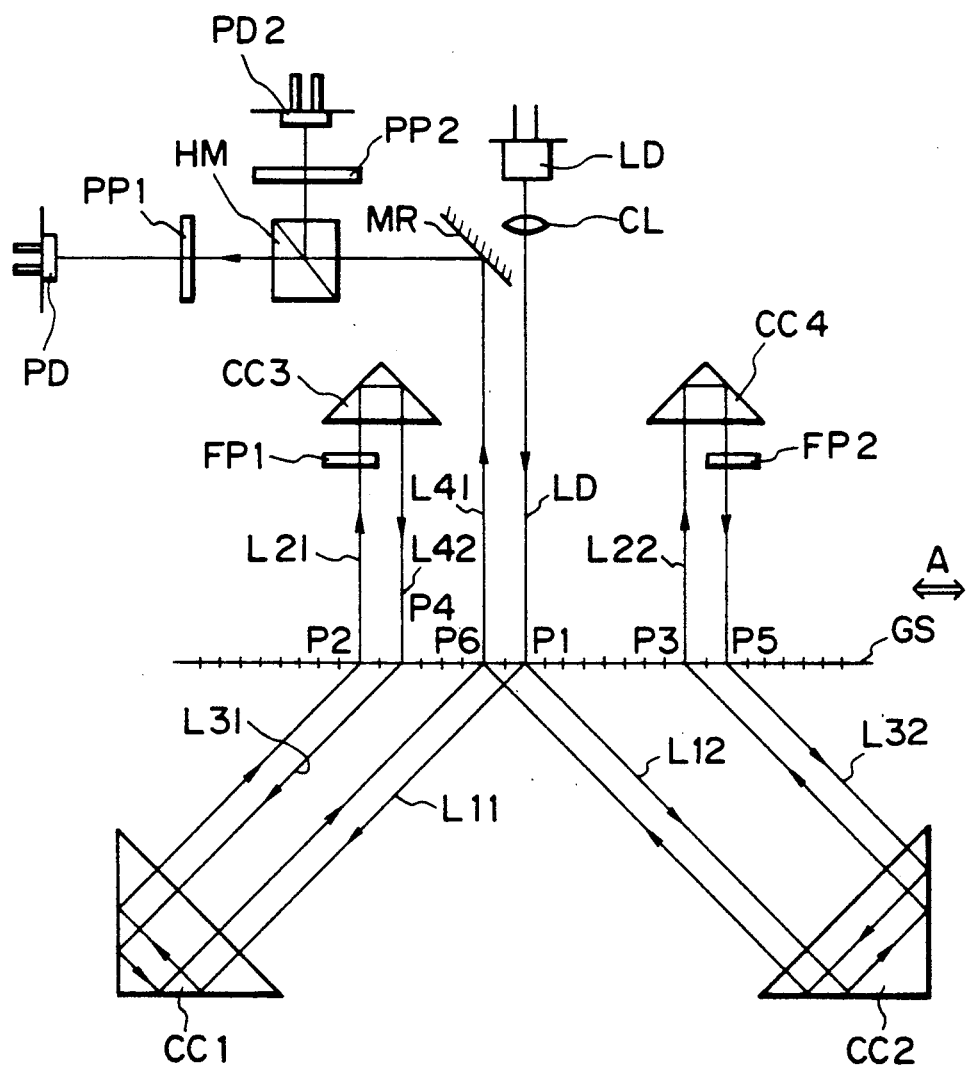
FIG. 36 is a schematic view of a grating interference type distance measuring device according to a still further embodiment of the present invention, wherein light passes through a distance measuring reference grating four times so as to improve the resolution of the system.

FIG. 36 shows an example of a grating interference type distance measuring device wherein corner cubes are used to bend or deflect optical paths so that each diffraction light goes and returns twice, whereby the number of light division by a distance measuring reference grating GS is increased to eight (8) with a result of increased resolution.

In a distance meter of such structure as disclosed in the aforementioned Japanese Laid-Open Patent Applications, Laid-Open Nos. Sho58-191906 and Sho58-191907, for example, the quantity of light on a photosensor changes at intervals corresponding to one-fourth (¼)

of the pitch of a used grating, such as depicted by signals R and S shown in the parts (a) and (b) of FIG. 3. In the grating interference type distance meter disclosed in these Japanese Patent Applications, the period of such a light quantity detection signal (R or S) is electrically divided to increase the number of pulse signals per one pitch of the grating to thereby improve the resolution. However, where the division is made by electrical processing, there is a possibility that the pulse spacing changes with the change in the amplitude of a signal or in the DC level. If this occurs, the precision is degraded.

In the present embodiment, as compared therewith, the optical system of the measuring device is arranged so that the number of times of light diffraction at the distance measuring reference grating GS is increased with a result that the quantity of light upon a photosensor changes, by many times (e.g. eight times), during a time period during which the reference grating GS moves by an amount corresponding to one pitch thereof. With this arrangement, the quantity of light upon the photosensor changes at very short intervals such as, for example, one-eighth of the pitch of the reference grating. Thus, with the optical arrangement itself, the number of divisions with regard to the grating (grating pitch) is increased.

In FIG. 36, the light emanating from a light source LD, which comprises a semiconductor laser, for example, of the grating interference type distance measuring optical system is transformed into a plane wave light L0 by means of a collimator lens CL and then impinges on a point P1 on the distance measuring reference grating GS which is in a relatively movable relation with the distance measuring optical system. The light incident on the reference grating GS is diffracted thereby. Positive and negative N-th order diffraction lights L11 and L12 caused thereby enter into corner cubes CC1 and CC2, respectively, and are reflected thereby, each reflected light travelling in a direction parallel to its oncoming path and reversely. The reflected lights from the corner cubes CC1 and CC2 are incident again on the reference grating GS at points P2 and P3, respectively, and are diffracted again by the grating GS. These diffracted lights denoted at L21 and L22 pass through phase plates FP1 and FP2, respectively, so that the state of polarization of each light is changed. After being reflected by corner cubes CC3 and CC4, the lights L21 and L22 come back to the grating GS at points P4 and P5 and are diffracted again by the grating GS. These diffraction lights as denoted at L31 and L32 are reflected again by the corner cubes CC1 and CC2, respectively, and they come back to the grating GS and are incident upon the same point P6 whereat they are diffracted again (the fourth diffraction). The fourth-diffracted lights denoted at L41 and L42 interfere with each other. The interfering light goes to a beam splitter HM by way of a mirror MR, and they are separated into two which are directed by way of polarizing plates PP1 and PP2 to sensors PD1 and PD2, respectively.

The phase plates FP1 and FP2 may comprise quarter waveplates, for example, and are set so that their fast axes are inclined at angles +45 degrees and −45 degrees with respect to the linearly polarized components of the laser beams L21 and L22, respectively. Also, the polarizing plates PP1 and PP2 may be set so as to have angles 0 degree and 45 degrees, respectively. With the above-described arrangement, those signals as having intensities varying with a phase difference of 90 degrees are obtainable at the two sensors PD1 and PD2. Further, where the pitch of the distance measuring reference grating is 2.4 micron and when the order of diffraction at each of various and times is "±1-st", there are produced at the sensors PD1 and PD2 those signals having 0.3 micron spacing which is one-eighth (⅛) of the pitch of the grating. By dividing the thus determined pulse interval in accordance with the electrical division method described with reference to FIGS. 2 and 4, for example, pulse signals of a number twice larger than the pulse number just described, that is thirty-two pulses per one pitch with interval of 0.075 micron, are obtainable.

While the invention has been described with reference to the structures disclosed herein, it is not confined to the details set forth and this application is intended to cover such modifications or changes as may come within the purposes of the improvements or the scope of the following claims.

What is claimed is:

1. A device for measuring a relatively moving distance of first and second relatively moving objects, said device comprising:

first measuring means including (i) moving means provided on the first object and being movable relative to the first object, (ii) light source means provided on one of the second object and said moving means, for projecting a light toward the other and (iii) photodetecting means provided on said one of the second object and said moving means, for detecting the light projected form the other, said first measuring means producing a pulse signal on the basis of a change in light intensity caused in the projected light with relative displacement between the second object and said moving means, each time the second object and said moving means relatively displace through a predetermined pitch;

second measuring means including means for producing an output signal which is variable in accordance with the amount of relative displacement between said moving means and the first object and within a range of said predetermined pitch;

control means operable to relatively move said moving means after the relative movement between the first and second objects; and detecting means for detecting the relatively moving distance of the first and second objects on the basis of the pulse signal upon relative movement of the first and second objects and the output signal corresponding to the distance of movement of said moving means made until, after the relative movement of the first and second objects, said first measuring means produces a pulse signal.

2. A device according to claim 1, wherein said first measuring means includes a light source, an illumination system, a detection optical system and a photodetector which are provided on the second object and a diffraction grating which is provided on said moving means, wherein light from said light source is directed by way of said illumination system to said diffraction grating to produce diffraction light, wherein the diffraction light produced by said diffraction grating is detected by said photodetector through said detection optical system whereby a pulse signal is produced and wherein said first measuring means outputs the thus obtained pulse signal.

3. A device according to claim 1, wherein said first measuring means includes a laser interferometric distance meter.

4. A device for measuring a relatively moving distance of first and second relatively moving objects, said device comprising:

first measuring means including (i) moving means provided on the first object and being movable relative to the first object, (ii) light source means provided on one of the first object and said moving means, for projecting a light upon the other and (iii) photodetecting means provided on said one of the first object and said moving means, for detecting the light projected form the other, said first measuring means producing a pulse signal on the basis of a change in light intensity caused in the projected light with relative displacement between the first object and said moving means, each time the first object and said moving means, each time the first object and said moving means relatively displace through a predetermined pitch;

second measuring means including means for producing an output signal which is variable in accordance with the amount of relative displacement between said moving means and the first object and within a range of said predetermined pitch;

control means operable to relatively move said moving means after the relative movement between the first and second objects; and detecting means for detecting the relatively moving distance of the first and second objects on the basis of the pulse signal upon relative movement of said moving means and the electric level signal outputted form said second measuring means when said first measuring means produces a predetermined pulse signal.

5. A device, usable with first and second relatively movable objects, for measuring relative displacement between the first and second objects in a predetermined direction, said device comprising:

first detecting means for detecting a change in distance between the first and second objects along a predetermined axis resulting form relative displacement between the first and second objects, with said axis intersecting the predetermine direction of movement of one of the objects; and second detecting means, in cooperation with said first detecting means, for detecting the amount of relative displacement between the first and second objects based on the detection by said first detecting means.

6. A device according to claim 5, further comprising a member having an array of inclined faces fixed to the first object, wherein said first detecting means detects a change in distance between said member and the second object along said predetermined axis.

7. A device according to claim 5, wherein said first detecting means includes a member having an array of inclined faces and being provided on the first object and a detecting system provided on the second object for detecting a change in distance between the second object and said member along said predetermined axis.

8. A device according to claim 7, wherein said array of inclined faces on said member is formed into a blazed grating structure.

9. A device according to claim 7, wherein said predetermined axis is substantially perpendicular to the predetermined direction in which the first and second objects are relatively displaceable.

10. A device according to claim 7, wherein said array of inclined faces on said member is formed substantially along said predetermined direction with a predetermined pitch, and wherein said detecting system of said first detecting means defines first and second detection points on said array of inclined faces which are mutually shifted from each other substantially along the predetermined direction by an amount approximately equal to a product on one half of the pitch multiplied by an odd number.

11. A device according to claim 10, wherein said second detecting means uses detection results alternately obtained from said first and second detection points to detect the amount of relative displacement of the first and second objects.

12. A device according to claim 7, wherein said member of said first detecting means has two arrays of inclined faces extending parallel to each other and substantially along the predetermined direction, and wherein said two arrays of inclined faces have substantially the same pitch but are shifted from one another by an amount approximately equal to one half of the pitch.

13. A device according to claim 12, wherein said detecting system of said first detecting means defines first and second detection points on said two arrays of inclined faces, and wherein said second detecting means uses detection results alternately obtained from said first and second detection points to detect the relative displacement of the first and second objects.

14. A device according to claim 7, wherein said detecting system of said first detecting means includes an optical arrangement having a focal point to be defined adjacent to an inclined face of said member at a point in time and produces a signal corresponding to the state of focus of said optical arrangement with respect to said inclined face.

15. A device according to claim 7, further comprising pulse signal producing means for producing a pulse signal in response to relative displacement of the first and second objects through a unit distance, wherein said second detecting means detects the amount of relative displacement of the first and second objects on the basis of the pulse signal produced by said pulse signal producing means and of the detection made by said first detecting means.

16. A device according to claim 15, wherein said pulse signal producing means includes a grating interference gauge.

17. A device according to claim 5, wherein one of the first and second objects is formed with an array of inclined faces and wherein said first detecting means detects a change in distance from the other of the first and second objects to said array along said predetermined axis.

18. A device according to claim 7, wherein the first object is formed with an array of inclined faces and wherein said first detecting means includes a detecting system provided on the second object for detecting a change in distance therefrom to the first object having said array of inclined faces formed thereon, along said predetermined axis.

19. A device according to claim 18, wherein said array of inclined faces on the first object is formed into a blazed grating structure.

20. A device according to claim 18, wherein said predetermined axis is substantially perpendicular to the predetermined direction in which the first and second objects are relatively displaceable.

21. A device according to claim 18, wherein said array of inclined faces of the first object is formed substantially along the predetermined direction with a predetermined pitch, and wherein said detecting system of said first detecting means defines first and second detection points on said array of inclined faces which are mutually shifted form each other substantially along said predetermined direction by an amount approximately equal to a product of one half of the pitch multiplied by an odd number.

22. A device according to claim 21, wherein said second detecting means uses detection results alternately obtained from said first and second detection points to detect the amount of relative displacement of the first and second objects.

23. A device according to claim 18, wherein the first object is formed with two arrays of inclined faces extending parallel to each other and substantially along the predetermined direction, and wherein said two arrays of inclined faces have substantially the same pitch but are shifted from one another by an amount approximately equal to one half of the pitch.

24. A device according to claim 23, wherein said detecting system of said first detecting means defines first and second detection points on said two arrays of inclined faces, and wherein said second detecting means uses detection results alternately obtained from said first and second detection points to detect the relative displacement of the first and second objects.

25. A device according to claim 18, wherein said detecting system of said first detecting means includes an optical arrangement having a focal point to be defined adjacent to an inclined face of the first object at a point in time, and produces a signal corresponding to the state of focus of said optical arrangement with respect to said inclined face.

26. A device according to claim 18, further comprising pulse signal producing means for producing a pulse signal in response to relative displacement of the first and second objects through a unit distance, wherein said second detecting means detects the amount of relative displacement of the first and second objects on the basis of the pulse signal produced by said pulse signal producing means and of the detection made by said first detecting means.

27. A device according to claim 26, wherein said pulse signal producing means includes a grating interference gauge.

28. A device for measuring relative moving distance of first and second relatively movable objects, said device comprising:
  periodic signal producing means for producing a periodic signal for each relative displacement through a first pitch, between the first and second objects;
  signal dividing and outputting means for dividing the periodic signal produced by said periodic signal producing means and for outputting a pulse signal for each relative displacement through a second pitch, smaller than the first pitch, between the first and second objects;
  first measuring means for measuring relative displacement of the first and second objects at a unit of the second pitch, by using pulse signals produced by said signal dividing and outputting means; and
  second measuring means for measuring relative displacement of the first and second objects of an amount smaller than the second pitch.

29. A device according to claim 28, wherein a third object is provided on the first object relatively movable to the first object, wherein said periodic signal producing means includes first detecting means for optically detecting relative displacement between the second object and the third object, as the third object does not move relative to the first object, and wherein said second measuring means includes second detecting means for detecting relative displacement between the first object and the third object as the third object moves relative to the first object.

30. A device according to claim 29, wherein the third object moves relative to the first object after the detection by said first detecting means.

31. A method of measuring relative moving distance of first and second relative movable objects, said method comprising the steps of:
  relatively moving the first and second objects;
  moving a third object, provided on the first object, relative to the first object and to the second object;
  detecting relative displacement between the first and third objects at a unit of a predetermined pitch;
  detecting relative displacement between the second object and the third object, of an amount smaller than the predetermined pitch; and
  determining the relative displacement between the first and second objects on the basis of the detection of the relative displacement of the first and third objects and the detection of the relative displacement of the second and third objects.

32. A method according to claim 31, wherein the third object is moved relative to the first and second objects after the relative movement of the first and second objects.

33. A device for measuring relative moving distance of first and second relatively movable objects, said device comprising:
  first measuring means having a third object placed on the first object and relatively movable to the first object and pulse signal producing means for producing a pulse signal for each relative displacement through a predetermined pitch, between the first and third objects;
  second measuring means for producing an output signal which is variable with relative displacement of the second and third objects of an amount smaller than the predetermined pitch; and
  distance detecting means for detecting the relative moving distance of the first and second objects on the basis of pulse signals produced by said first measuring means in response to the relative displacement between the first and third objects and of an output signal produced by said second measuring means when said first measuring means produces a pulse signal.

34. A device according to claim 33, further comprising control means for first causing relative displacement between the first and second objects and then causing relative displacement of the third object relative to the first and second objects.

35. A device for detecting a change in the relative position of first and second relatively movable objects, said device comprising:

first detecting means for detecting a change in the relative position of the first and second objects in predetermined pitch units; and second detecting means having a higher resolution than said first detecting means and being capable of detecting a change in the relative position of the first and second objects in sub-units smaller than the predetermined pitch units, wherein said second detecting means includes optical detecting means provided on a selected one of either the first and second object and having light projecting means for projecting light to the other of the first and second objects, and light receiving means for receiving the light reflected by the other object, for resolving the relative position of the first and second objects on the basis of the incident position of the light upon said light receiving means, with the incident position varying with the positional relationship between said optical detecting means and the object irradiated by the light from said light projecting means.

* * * * *

UNITED STATES PATENT AND TRADEMARK OFFICE
CERTIFICATE OF CORRECTION

PATENT NO. : 5,122,660
DATED : June 16, 1992
INVENTOR(S) : Minoru Yoshii, et al.

It is certified that error appears in the above-identified patent and that said Letters Patent is hereby corrected as shown below:

ON THE TITLE PAGE
[56] REFERENCES CITED:

FOREIGN PATENT DOCUMENTS, "0045321 10/1982 European Pat. Off." should read --0045321 2/1982 European Pat. Off.--.

COLUMN 1:

Line 20, "Sho58191906" should read --Sho 58-191906-- and "Sho58 191907" should read --Sho 58-191907--.

COLUMN 7:

Line 1, "$y_+=a \exp(i(wt-\phi/2))$" should read --$y_+=a\{i(wt-\phi/2)\}$--.
Line 3, "$x_+=a \exp(i(wt-\pi/2))$" should read --$x_+=a \exp\{i(wt-\pi/2)\}$--.
Line 15, "$y=y_++y_-=a(\exp(i\phi/2) + \exp(-i\phi/2))$" should read --$y=y_++y_-=a\{\exp(i\phi/2) + \exp(-i\phi/2)\}$--.
Line 17, "$x=x_++x_-=a(\exp(i\phi/2) - \exp(-i\phi/2))$" should read --$x=x_++x_-=a\{\exp(i\phi/2) - \exp(-i\phi/2)\}$--.
Line 30, "$\theta=2\pi\{x/(p/4)\}=(8\pi/p)x$" should read --$\phi=2\pi\{x/(p/4)\}=(8\pi/p)x$--.
Line 50, "$\pi/4=(4\pi x)/ps$" should read --$\pi/4=(4\pi x)/p$--.

COLUMN 11:

Line 63, "held MH" should read --head MH--.

UNITED STATES PATENT AND TRADEMARK OFFICE
CERTIFICATE OF CORRECTION

PATENT NO. : 5,122,660

DATED : June 16, 1992

INVENTOR(S) : Minoru Yoshii, et al.

It is certified that error appears in the above-identified patent and that said Letters Patent is hereby corrected as shown below:

COLUMN 15:

Line 62, "complementating" should read --complementing--.

COLUMN 22:

Line 54, "upon" should read --thereupon--.

COLUMN 24:

Line 3, "various" should read --various points--.
Line 31, "form" should read --from--.

COLUMN 25:

Line 14, "form" should read --from--.
Line 34, "form" should read --from--.
Line 44, "form" should read --from--.

COLUMN 26:

Line 11, "on" should read --of--.
Line 57, "claim 7," should read --claim 5, --.

UNITED STATES PATENT AND TRADEMARK OFFICE
CERTIFICATE OF CORRECTION

PATENT NO. : 5,122,660
DATED : June 16, 1992
INVENTOR(S) : Minoru Yoshii, et al.

It is certified that error appears in the above-identified patent and that said Letters Patent is hereby corrected as shown below:

COLUMN 27:

Line 9, "form" should read --from--.

COLUMN 28:

Line 20, "relative" should read --relatively--.

Signed and Sealed this

Twenty-third Day of November, 1993

Attest:

BRUCE LEHMAN

Attesting Officer	Commissioner of Patents and Trademarks